US010680445B2

(12) United States Patent
Kudo et al.

(10) Patent No.: US 10,680,445 B2
(45) Date of Patent: Jun. 9, 2020

(54) POWER GENERATION CONTROL DEVICE, POWER GENERATION APPARATUS, CONTROL DEVICE, CONTROL SYSTEM, CONTROL METHOD, AND RECORDING MEDIUM

(71) Applicant: NEC Corporation, Tokyo (JP)

(72) Inventors: Koji Kudo, Tokyo (JP); Noriaki Kobayashi, Tokyo (JP); Kosuke Homma, Tokyo (JP); Katsuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 15/555,413

(22) PCT Filed: Mar. 4, 2015

(86) PCT No.: PCT/JP2015/056391
§ 371 (c)(1),
(2) Date: Sep. 1, 2017

(87) PCT Pub. No.: WO2016/139781
PCT Pub. Date: Sep. 9, 2016

(65) Prior Publication Data
US 2018/0041043 A1 Feb. 8, 2018

(51) Int. Cl.
*H02J 3/46* (2006.01)
*G06Q 50/06* (2012.01)
(Continued)

(52) U.S. Cl.
CPC ............... *H02J 3/46* (2013.01); *G06Q 50/06* (2013.01); *H02J 3/382* (2013.01); *H02J 13/00* (2013.01);
(Continued)

(58) Field of Classification Search
CPC .... H02J 3/46; H02J 3/382; H02J 13/00; H02J 13/0006; H02J 3/386; H02J 3/383;
(Continued)

(56) References Cited

U.S. PATENT DOCUMENTS

2007/0276547 A1* 11/2007 Miller ................... G06Q 50/06
700/295
2009/0319415 A1 12/2009 Stoilov et al.

FOREIGN PATENT DOCUMENTS

JP  2011-130638  6/2011
JP  2012-55090   3/2012
(Continued)

OTHER PUBLICATIONS

International Search Report dated May 26, 2015, in corresponding PCT International Application.
(Continued)

*Primary Examiner* — Jung Kim
(74) *Attorney, Agent, or Firm* — Finnegan, Henderson, Farabow, Garrett & Dunner, L.L.P.

(57) ABSTRACT

A power generation control device is provided with: a communication unit that receives output control information determined on the basis of a first index that relates to the output state at a power generation device group and a second index that relates to the output state at a predetermined power generation device; and a control unit that controls the output of the predetermined power generation device on the basis of the output control information.

8 Claims, 14 Drawing Sheets

(51) Int. Cl.
*H02J 3/38* (2006.01)
*H02J 13/00* (2006.01)

(52) U.S. Cl.
CPC ............... *H02J 3/383* (2013.01); *H02J 3/386* (2013.01); *H02J 13/0006* (2013.01); *Y02E 10/563* (2013.01); *Y02E 10/763* (2013.01); *Y02E 40/72* (2013.01); *Y04S 10/123* (2013.01)

(58) Field of Classification Search
CPC ..... G06Q 50/06; Y04S 10/123; Y02E 10/763; Y02E 10/563; Y02E 40/72; Y02E 10/766; Y02E 40/725
See application file for complete search history.

(56) References Cited

FOREIGN PATENT DOCUMENTS

| JP | 2012-196116 | | 10/2012 | |
|----|----|----|----|----|
| JP | 2013-005537 | A | 1/2013 | |
| JP | 2013-013178 | | 1/2013 | |
| JP | 2013-126260 | | 6/2013 | |
| JP | 2013-207862 | | 10/2013 | |
| JP | 2013207862 | A * | 10/2013 | ............... H02J 3/38 |
| JP | 5460622 | | 4/2014 | |
| JP | 2014-90665 | | 5/2014 | |

OTHER PUBLICATIONS

Notification of Reasons for Refusal dated Jan. 16, 2018, by the Japanese Patent Office in counterpart Japanese Patent Application No. 2017-044116.

Notification of Reasons for Refusal dated Nov. 8, 2016, by the Japanese Patent Office in counterpart Japanese Patent Application No. 2015-543210.

Notification of Reasons for Refusal dated Feb. 12, 2019, by the Japanese Patent Office in counterpart Japanese Patent Application No. 2018-095556.

* cited by examiner

POWER GENERATION CONTROL DEVICE, POWER GENERATION APPARATUS, CONTROL DEVICE, CONTROL SYSTEM, CONTROL METHOD, AND RECORDING MEDIUM

CROSS-REFERENCE TO RELATED PATENT APPLICATION

This application is a National Stage Entry of International Application No. PCT/JP2015/056391. The entire contents of the above-referenced application is expressly incorporated herein by reference.

TECHNICAL FIELD

The present invention relates to a power generation control device, a power generation apparatus, a control device, a control system, a control method, and a program for controlling a power generation device.

BACKGROUND ART

A power system is known that is connected to a power generation device (hereinbelow referred to a "renewable energy power source") that uses renewable energy such as a photovoltaic power generation device or a wind power generation device to generate power. In a power system that is connected to a renewable energy power source, the necessity arises of limiting output of a power generation device such as a renewable energy power source (power supply) when the power supply surpasses power demand.

Patent Document 1 describes a power system control system that limits the output of a PV (Photovoltaic power generation) device that is connected to the power system.

This power system control system divides a plurality of PV devices into groups on the basis of the rated output of the PV devices. This power system control system then limits the output of the PV devices in group units to satisfy the balance of power supply/demand.

LITERATURE OF THE PRIOR ART

Patent Documents

Patent Document 1: JP 5460622B

SUMMARY

Problem to be Solved by the Invention

Systems are currently being investigated in which the manager of a power system (for example, a power company) purchases the output (electric power) of power generation devices from an aggregator or Power Producer and Supplier (PPS), an Independent Power Producer (IPP), and typical customers that have, for example, renewable energy power sources.

According to this system, when power generation devices (for example, renewable energy power sources) of a plurality of IPPs are each connected to a power system, it is not desirable that priority always be given to the purchase of the output of the power generation device of a specific IPP and that the output of power generation devices of other IPPs always be limited. A state is therefore sought in which, when the necessity arises for limiting the output of power generation devices such as renewable energy power sources, the output of each power generation device is limited such that equitability of output limitation is maintained.

The power system control system described in Patent Document 1 is a system that merely limits the output of PV devices in group units for satisfying the balance of power supply/demand and that gives no consideration to the equitability of power limitation. Accordingly, the limitation of the output of each power generation device in order to maintain equitability in this power system control system was problematic.

It is an object of the present invention to provide a power generation control device, a power generation apparatus, a control device, a control system, a control method, and a program that can solve the above-described problem.

Means for Solving the Problem

A power generation control device of the present invention is provided with a communication unit that receives output control information that is determined on the basis of a first index that relates to the output state at a power generation device group and a second index that relates to the output state at a predetermined power generation device, and a control unit that controls the output of the predetermined power generation device on the basis of the output control information.

A power generation control device of the present invention is provided with: a determination unit that determines output control information on the basis of a first index that relates to the output state at a power generation device group and a second index that relates to the output state at a predetermined power generation device, and a control unit that controls the output of the predetermined power generation device on the basis of the output control information.

A power generation apparatus of the present invention is provided with the above-described power generation control device and a predetermined power generation device.

A control device of the present invention is provided with a determination unit that determines output control information of at least a portion of power generation devices among a plurality of power generation devices on the basis of a first index that relates to the output state at a power generation device group and a second index that relates to the output state at a plurality of power generation devices that belong to the power generation device group, and a communication unit that transmits the output control information to corresponding power generation devices.

A control device of the present invention is provided with a determination unit that determines output control information on the basis of a first index that relates to the output state at a power generation device group and a second index that relates to fee output state at a predetermined power generation device, and a control unit that controls the output of the predetermined power generation device on the basis of the output control information.

A control system of the present invention is provided with a plurality of power generation control devices corresponding to each of power generation devices that belong to a power generation device group and a control device that communicates with the power generation control devices; wherein the control device is provided with a determination unit that determines output control information of the power generation devices on the basis of a first index that relates to the output state at the power generation device group and a second index that relates to the output state at each of the power generation devices and a first communication unit that transmits the output control information to the corresponding power generation control devices; and the power generation control devices are each provided with a second communication unit that receives the output control information and a control unit that controls the output of the corresponding power generation device on the basis of the output control information received by the second communication unit.

A control method of the present invention has steps of: receiving output control information that has been determined on the basis of a first index that relates to the output state at a power generation device group and a second index that relates to the output state at a predetermined power generation device, and controlling output of the predetermined power generation device on the basis of the output control information.

A control method of the present invention has steps of: determining output control information on the basis of a first index that relates to the output state at a power generation device group and a second index that relates to the output state at a predetermined power generation device, and controlling the output of the predetermined power generation device on the basis of the output control information.

A control method of the present invention has steps of: determining output control information of at least a portion of power generation devices among a plurality of power generation devices on the basis of a first index that relates to the output state at a power generation device group and a second index that relates to the output state at a plurality of power generation devices that belong to the power generation device group, and transmitting the output control information to corresponding power generation devices.

A control method of the present invention has steps of: determining output control information on the basis of a first index that relates to the output state at a power generation device group and a second index that relates to the output state at a predetermined power generation device, and controlling the output of the predetermined power generation device on the basis of the output control information.

A recording medium of the present invention is a recording medium that can be read by a computer and that records a program for causing a computer to execute a reception procedure of receiving output control information that has been determined on the basis of a first index that relates to the output state at a power generation device group and a second index that relates to the output state at a predetermined power generation device, and a control procedure of controlling the output of the predetermined power generation device on the basis of the output control information.

A recording medium of the present invention is a recording medium that can be read by a computer and that records a program for causing a computer to execute a determination procedure of determining output control information on the basis of a first index that relates to the output state at a power generation device group and a second index that relates to the output state at a predetermined power generation device, and a control procedure of controlling output of the predetermined power generation device on the basis of the output control information.

A recording medium of the present invention is a recording medium that can be read by a computer and that records a program for causing a computer to execute a determination procedure of determining output control information of at least a portion of power generation devices among a plurality of power generation devices on the basis of a first index that relates to the output state at a power generation device group and a second index that relates to the output state of the plurality of power generation devices that belong to the power generation device group, and a transmission procedure of transmitting the output control information to the corresponding power generation devices.

A recording medium of the present invention is a recording medium that can be read by a computer and that records a program for causing a computer to execute a determination procedure of determining output control information on the basis of a first index that relates to the output state at a power generation device group and a second index that relates to the output state at a predetermined power generation device, and a control procedure of controlling the output of the predetermined power generation device on the basis of the output control information.

Effect of the Invention

According to the present invention, the output of each power generation device can be limited so as to maintain equitability.

EXEMPLARY EMBODIMENT

Exemplary embodiments of the present invention are next described with reference to the accompanying drawings.

First Exemplary Embodiment

Figure 1A:
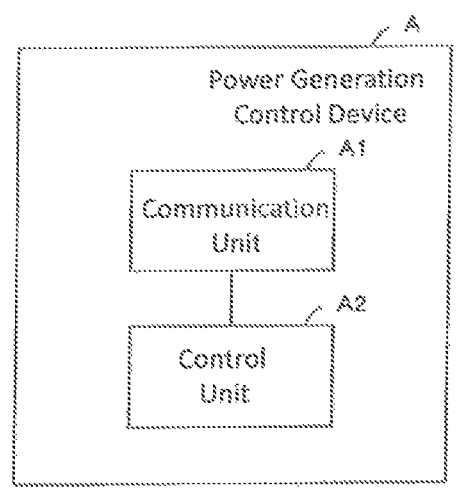
FIG. 1A shows power generation control device A of the first exemplary embodiment of the present invention.

FIG. 1A shows power generation control device A of the first exemplary embodiment of the present invention.

Power generation control device A controls a power generation device that is connected to a power system. The power generation device that is controlled by power generation control device A is also referred to as the "control-object power generation device". The control-object power generation device is an example of a predetermined power generation device.

The control-object power generation device is, for example, a power generation device (renewable energy power source) that uses renewable energy to generate power. Examples of renewable energy power sources include photovoltaic power generation devices, wind power generation devices, small hydraulic power generation devices, geothermal power generation devices, tidal power generation devices, and biomass power generation devices. In the following explanation, photovoltaic power generation devices and wind power generation devices are also referred to as "PV devices" and WT (Wind Turbine) devices," respectively. Renewable energy power sources are not limited to the above-described devices and can be altered as appropriate. In addition, a control-object power generation device may also be any power generation device, such as, apart from a renewable energy power source, a fuel cell battery or a gas turbine power generation device, that allows power generation limitation in time slots in which power generation limitation becomes necessary.

Power generation control device A includes communication unit A1 and control unit A2.

Communication unit A1 receives output limitation information for controlling the control-object power generation device.

The output limitation information is an example of an equitability index and output control information.

The output limitation information is determined on the basis of a first index that relates to the output limitation state at a power generation device group to which a plurality of power generation devices belong and a second index that relates to the output limitation state of the control-object power generation device. The output limitation state is an example of the output state.

Here, the output limitation state and output state are, for example, the amount of power generation or amount of power generation limitation resulting from output control in a power generation device group or power generation device, a maximum-value amount of power generation (maximum-value output), the ON/OFF state of a device, the time during which output is controlled, and the electricity sales profit or electricity sales loss that results from output control.

The first index is an example of a reference Index. The second index Is an example of an individual index.

Here, a control-object power generation device may belong or need not belong to a power generation device group.

In the following explanation, a control-object power generation device is assumed to belong to a power generation device group.

When the first index and second index are taken into consideration with regard to power generation device groups, a power generation device group that is made up of renewable energy power sources that belong to the same renewable energy power source category can reflect differences in characteristics that accompany the type of renewable energy power source and is therefore preferable from the standpoint of equitability. Further, within the same renewable energy power source category, it is preferable front the standpoint of equitability to take power sources having the same maximum-value output power (rated value or contracted capacity) as the object of the first index or second index because differences of the absolute value of the limited power, which changes according to, for example, the maximum-value of output power, can be reflected when limiting power generation.

As the first index in the present exemplary embodiment, an index is used having a value that decreases in proportion to the increase of the degree of output limitation in the entire power generation device group. As the second index, an index is used having a value that decreases as the degree of output limitation increases in the control-object power generation device.

The first index and second index are determined, for example, on the basis of the amount of generated power of each power generation device that belongs to a power generation device group.

For example, the first index is the ratio of the amount, of generated power of a power generation device group in a time slot that has elapsed among output limitation time slots with respect to a reference amount of generated power of a power generation device group in a predetermined time slot (for example, a time slot that has elapsed among output limitation time slots, or a unit time slot). The output limitation time slot is an example of an output control time slot.

A "time slot that has elapsed among output limitation time slots" is hereinbelow referred to as simply an "elapsed time slot". An "elapsed time slot" may also be the accumulated time slots of each of time slots that have elapsed of a plurality of output limitation time slots that were implemented in the past.

The second index is the ratio of the amount of generated power of a power generation device that is the control object in an elapsed time slot with respect to a reference amount of generated power of the control-object power generation device in a predetermined time slot.

The value here used as the reference amount of generated power of a power generation device group is, for example, the sum total of the values obtained by multiplying the maximum value of the output power of each power generation device that belongs to the power generation device group by time length of the predetermined time slot. The value used as the reference amount of generated power of the control-object power generation device is, for example, a value obtained by multiplying the maximum value of the output power of the control-object power generation device by the time length of the predetermined time slot.

Examples of the maximum value of the output power of each power generation device and the maximum value of the output power of the control-object power generation device are the rated value of the output power of each power generation device and the rated value of the output power of the control-object power generation device.

The maximum value of the output power of each power generation device and the maximum value of the output power of the control-object power generation device are not limited to the rated value and can be altered as appropriate. For example, the maximum value of the output power of each power generation device and the maximum value of the output power of the control-object power generation device may also be the contracted maximum value of the output power of each power generation device and the contracted maximum value of the control-object power generation device. Here, the contracted maximum value Is, for example, the maximum value of the output power (for example, a contracted capacity) of a power generation device that has been established by a contract between the manager of a power generation device (for example, a PPS) and the manager of a power system (for example, a power company).

As the first index, an index may be used in which the value increases in proportion to the increase of the degree of output limitation among the entire power generation device group, and as the second index, an index may be used in which the value increases in proportion to the increase of the degree of the output limitation in the control-object power generation device.

For example, as the first index, a value may be used that is the ratio of the amount of power limitation of a power generation device group in an elapsed time slot with respect to a reference amount of generated power of the power generation device group in a predetermined time slot (for example, an elapsed time slot among output limitation time slots or a unit time slot). Then, as the second Index, a value may be used that is the ratio of the amount of power limitation of the control-object power generation device in an elapsed time slot with respect to a reference amount of generated power of the control-object power generation device in the predetermined time slot.

As the amount of power limitation of the power generation device group, for example, a value is used that is obtained by subtracting the amount of generated power of the power generation device group in an elapsed time slot from the reference amount of generated power of the power generation device group in an elapsed time slot. Then, as the amount of power limitation of the control-object, power generation device, for example, a value is used that is obtained by subtracting the amount of generated power of the control-object power generation device in an elapsed time slot from the reference amount of generated power of the control-object power generation device in an elapsed time slot.

The output limitation information is determined by an external device on the basis of the first index and the second index such that, for example, the difference between the output limitation state in the power generation device group in an output limitation time slot and the output limitation state of the control-object power generation device in the same output limitation time slot decreases. The above-described difference is hereinbelow referred to as the "state difference".

For example, when the degree of output limitation in the control-object power generation device that is specified by the second index is greater than the degree of output limitation in the entire power generation device group that is specified by the first index, the external device, at the next instance of power generation limitation, determines output limitation information that decreases the degree of output limitation in the control-object power generation device.

Further, when the degree of output limitation in the control-object power generation device that is specified by the second index is smaller than the degree of output limitation in the entire power generation device group that is specified by the first index, the external device determines in the next instance of power generation limitation output limitation information that increases the degree of output limitation in the control-object power generation device.

Still further, when the degree of output limitation in fee control-object power generation device that is specified by the second index Is the same (identical degree) as the degree of output limitation in the entire power generation device group that is specified by the first index, the external device determines, at the next instance of power generation limitation, output limitation information that does not alter the degree of output limitation in the control-object power generation device.

In the present exemplary embodiment, the output limitation information indicates the maximum value of the amount of power generation of the control-object power generation device. The maximum-value amount of power generation is an example of the maximum-value output. In this case, the maximum-value amount of power generation of the control-object power generation device decreases in proportion to increase of the degree of output limitation.

When the amount of output limitation requested of a power generation device group is uniform over an output limitation time slot, the external device determines output limitation information that increases the range of alteration of the maximum-value amount of power generation of a predetermined power generation device in proportion to increase of the difference between the first index and second index such that the state difference decreases. The amount of output limitation is an example of the amount of output control.

The information indicated by the output limitation information is not limited to the maximum-value amount of power generation and can be altered as appropriate to, for example, the time of output limitation.

The external device transmits the output limitation information to power generation control device A. Communication unit A1 receives the output limitation information from the external device.

Control unit A2 controls the output of the control-object power generation device on the basis of the output limitation information that was received by communication unit A1.

The operation is next described.

Figure 1B:
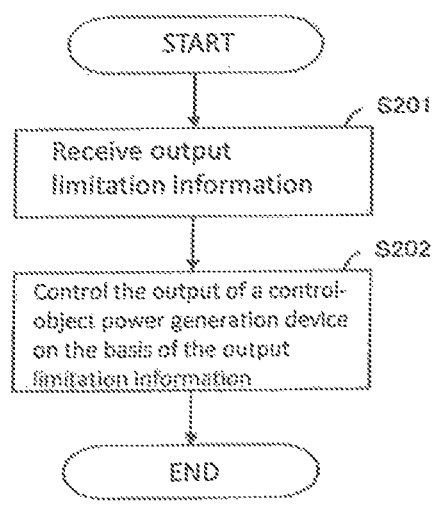
FIG. 1B is a flow chart for describing the operation of power generation control device A.

FIG. 1B is a flow chart for describing the operation of power generation control device A.

Communication unit A1 receives output limitation information (Step S201). Communication unit A1 next supplies the output limitation information to control unit A2.

Upon receiving the output limitation information, control unit A2 controls the output of the control-object power generation device on the basis of the output limitation information (Step S202). In the present exemplary embodiment, control unit A2 limits the power supplied from the control-object power generation device to the power system to no more than the maximum-value amount of power generation that is indicated by the output limitation information.

The effect of the present exemplary embodiment is next described.

In the present exemplary embodiment, communication unit A1 receives output limitation information that reflects the output limitation state in the control-object power generation device and the output limitation state in the power generation device group that includes other power generation devices. The relation between the output limitation state among the control-object power generation device and the power generation device group that is reflected in the output limitation information represents the difference in output limitation states between the control-object power generation device and the other power generation devices. As a result, control unit A2 is able to improve the equitability of output limitation among power generation devices by controlling the output of the control-object power generation device on the basis of the output limitation information that reflects this difference.

In addition, the output limitation information is information determined on the basis of the first index and second index such that the difference between the output limitation state in the power generation device group and the output limitation state in the control-object power generation device decreases. As a result, control unit A2 is able to improve the equitability of output limitation among the power generation devices by controlling the output of the control-object power generation device on the basis of this output limitation information.

In addition, the output limitation information is information that, when the output limitation amount that is requested of the power generation device group is uniform over the output limitation time slot, increases the range of alteration of the maximum-value power generation amount of the control-object power generation device in proportion to the increase of the difference between the first index and the second index such that the state difference decreases. As a result, control unit A2 is able to improve equitability of output limitation among the power generation devices with high accuracy by controlling the output of the control-object power generation device on the basis of this output limitation information.

A modification of the present exemplary embodiment is next described.

When output limitation information is repeatedly transmitted with each updating, communication unit A1 may repeatedly receive the output limitation information. Control unit A2 may then control, the output of the control-object power generation device on the basis of the most recent output limitation information among the output limitation information that was received by communication unit A1. In this case, the output of the control-object power generation device can be controlled on the basis of the most recent output limitation information.

Control unit A2 may also control the output of the control-object power generation device on the basis of the most recent output limitation information at a time Interval that Is equal to or less than the reception interval of the output limitation information in communication unit A1. For example, when the control-object power generation device is a renewable energy power source, there is a potential for fluctuation in short time intervals of the output of the control-object power generation device itself due to weather conditions. The fluctuations in output of the control-object power generation device Itself can be accommodated by carrying out output control of the control-object power generation device in time intervals that are equal to or less than the reception Interval of the output limitation information.

Communication unit A1 may also transmit the amount of power generation of the control-object power generation device to the transmission origin of the output limitation information. In this case, communication unit A1 may transmit the amount of power generation of the control-object power generation device to the transmission origin of the output limitation information at a time interval that is equal to or less than the reception interval of the output limitation information. In this ease, the most recent amount of power generation of the control-object power generation device is reflected in the most recent output limitation information, thereby enabling an improvement of the accuracy of the power generation limitation control.

The estimated amount of power generation of the power generation device group in a predetermined time slot (the amount of power that theoretically can be generated in the time slot) may be used as the reference power generation amount of the power generation device group, and the estimated power generation amount, of the control-object power generation device in the predetermined time slot (the amount of power that theoretically can be generated in the time slot) may be used as the reference power generation amount of the control-object power generation device. In the following explanation, the estimated power generation amount Is referred to as the potential power generation amount.

The ratio of the electricity sales profit that accords with the amount of power generation of a power generation device group in an elapsed time slot with respect to a reference electricity sales profit of the power generation device group in the predetermined time slot may be used as the first index. At this time, the ratio of the electricity sales profit that accords with the power generation amount of the control-object power generation device in an elapsed time slot with respect to a reference electricity sales profit of the control object power generation device in the predetermined time slot may be used as the second index.

The sum total of values obtained by multiplying the unit electricity sales price at the power generation device by the value obtained by multiplying the time length of the predetermined time slot by the maximum value of the output power of each power generation device that belongs to the power generation device group can be offered as one example of the reference electricity sales profit of the power generation device group. In addition, a value obtained by multiplying the unit electricity sales price at the control-object power generation device by the value obtained by multiplying the predetermined time by the maximum value of the output power of the control-object power generation device is offered as an example of the reference electricity sales profit of the control-object power generation device.

Power generation control device A may determine output limitation information on the basis of the first index and the second index and control the output of the control-object power generation device on the basis of the output limitation information that was determined.

Figure 1C:
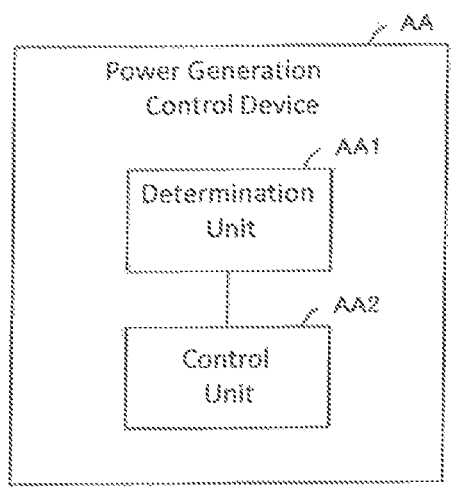
FIG. 1C shows a modification of the first exemplary embodiment of the present invention.

FIG. 1C shows an example of power generation control device AA that determines output limitation information on the basis of the first index and the second index.

Power generation control device AA includes determination unit AA1 and control unit AA2.

Determination unit AA1 determines output limitation information on the basis of the first index and the second index. The determination method of the output limitation information in the above-described external device is used as the determination method of the output limitation information in determination unit AA1.

Further, determination unit AA1 may also receive the first index and the second index from the above-described external device, or may receive the first index from an external device and generate the second index.

Control unit AA2 controls the output of the control-object power generation device on the basis of the output limitation information that was determined by determination unit AA1. The method of controlling the output of the control-object power generation device in control unit AA2 is, for example, similar to the method of controlling the output of the control-object power generation device in control unit A2.

To describe more specifically, power generation control device AA generates output limitation information (an example of output control information) on the basis of a first index that has been received and a second index that has been received or generated. Power generation control device AA then implements control of the output of the control-object power generation device on the basis of this output limitation information.

According to this modification, the load on an external device can be reduced because the external device is not required to determine the output limitation information.

In this modification, if the interval of receiving the first index is T1 and the interval of executing power generation control by means of the output limitation information that was determined on the basis of the first index and second index is T2, the relation T1>T2 is preferably satisfied.

For example, when control unit AA2 controls power generation at time interval T2 that is shorter than the interval T1 of receiving the first index, determination unit AA1 uses the most recent first index and second index to determine the output limitation information.

The first index that Is determined by a plurality of power generation device groups is an overall index and therefore does not fluctuate in a short interval, but the second index that relates to each power generation device fluctuates in short intervals due to, for example, weather conditions. As a result, power generation control can be carried out according to the actual power generation state of the power generation device by implementing power generation control at T2 that is shorter than T1. As a result, power generation control can be implemented with high accuracy.

As a result, output limitation information is preferably created each time power generation control is carried out by means of the most recent first index and the second index at that point in time to implement power generation control of the power generation control device.

Second Exemplary Embodiment

Figure 2A:
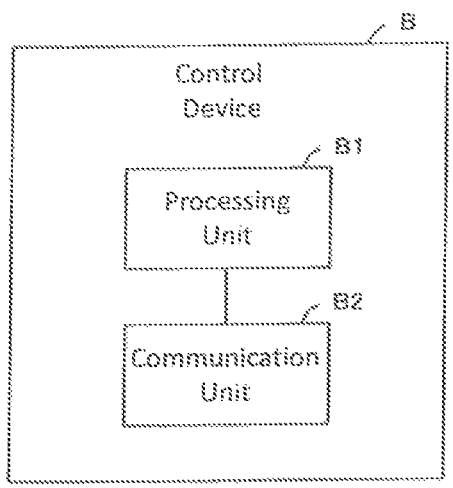
FIG. 2A shows control device B of the second exemplary embodiment of the present invention.

FIG. 2A shows control device B of the second exemplary embodiment of the present invention.

Control device B functions as an example of the external device that was described in the first exemplary embodiment.

Control device B includes processing unit B1 and communication unit B2.

Processing unit B1 is an example of a determination unit.

Processing unit B1 determines the output limitation information of each power generation device that belongs to a power generation device group on the basis of the first index and the second index that were described in the first exemplary embodiment. Here, the second index exists for each power generation device that belongs to the power generation device group. The power generation device group is similar to the power generation device group that was described in the first exemplary embodiment.

Processing unit B1 determines output limitation information on the basis of a first index and a second index such that, for each power generation device that belongs to a power generation device group, the difference (state difference) between the output limitation state in the power generation device group in an output limitation time slot and the output limitation state in a power generation device in the output limitation time slot decreases.

In the present exemplary embodiment, when the output limitation amount feat is requested of a power generation device group is uniform over an output limitation time slot, processing unit B1 determines output limitation information that increases the alteration range of the maximum-value power generation amount of the power generation device in proportion to the increase of the difference between the first index and second index such that the state difference decreases.

Processing unit B1 may also generate or determine the first index and second index, or receive the first index and second index from another device. For example, when an aggregator holds control device B, a command device of a central load dispatching office that is held by a power company may be offered as an example of this other device.

Processing unit B1 determines the first index and the second index by, for example, the method described in the first exemplary embodiment. In this case, processing unit B1 receives the power generation amount (the amount of generated power in an elapsed time slot) of each power generation device that belongs to a power generation device group by way of communication unit B2. In addition, processing unit B1 holds in advance constants (for example, the predetermined time and the maximum value of the output power of each power generation device) that are necessary to determine the first Index and second index.

Communication unit B2 transmits the output limitation information that was determined by processing unit B1 to the power generation device that corresponds to the output limitation information.

The operation of the present exemplary embodiment is next described.

Figure 2B:
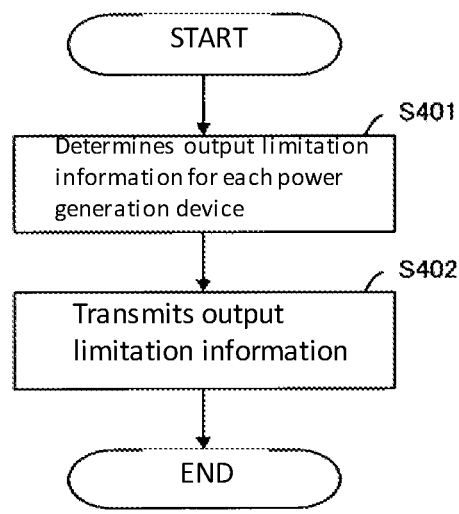
FIG. 2B is a flow chart for describing the operation of control device B.

FIG. 2B Is a flow chart for describing the operation of control device B.

Processing unit B1 determines, for each power generation device that belongs to a power generation device group, output limitation information on the basis of the first index and the second index of that power generation device such that the state difference decreases (Step S401).

An example of Step S401 is here described.

Processing unit B1 executes the following operation for each power generation device that belongs to the power generation device group.

When the degree of output limitation in a power generation device that is specified by the second index is greater than the degree of output limitation of the entire power generation device group that is specified by the first index, processing unit B1 determines output limitation information that decreases the degree of output limitation in that power generation device.

Alternatively, when the degree of output limitation in a power generation device that is specified by the second index is less than the degree of output limitation in the entire power generation device group that is specified by the first index, processing unit B1 determines output limitation information that increases the degree of output limitation in that power generation device.

In the present exemplary embodiment as well, as in the first exemplary embodiment, the output limitation information indicates the maximum-value power generation amount of the power generation device. In this case, the maximum-value power generation amount of the control-object power generation device decreases in proportion to increase of the degree of output limitation. Further, the output limitation information is not limited to the maximum-value power generation amount and can be altered as appropriate to, for example, the time of output limitation.

When the maximum-value power generation amount (output limitation amount) that is requested of the entire power generation device group has been established in an output limitation time slot, processing unit B1 determines each item of output limitation information such that the sum total of the maximum-value power generation amount of each power generation device is equal to or less than the maximum-value power generation amount of the entire power generation device group. Here, the maximum-value power generation amount of an entire power generation device group is, for example, assumed to be fixed in an output limitation time slot. The maximum-value power generation amount may be altered within all output limitation time slot. Further, a time slot obtained by dividing an output limitation time slot may be used as the predetermined time slot.

Processing unit B1 next transmits each item of output limitation information to the corresponding power generation device by way of communication unit B2 (Step S402).

Each power generation device, upon receiving the output limitation information, limits the power that is supplied from the power generation device to the power system to no more than the maximum-value power generation amount that is indicated by the output limitation information.

The effect of the present exemplary embodiment is next described.

In the present exemplary embodiment, processing unit B1 determines the output limitation information of each power generation device on the basis of a first index that relates to the output limitation state at a power generation device group and a second index that relates to the output limitation state at each power generation device that belongs to the power generation device group. The relation between the first index and the second index represents the difference in the output limitation state between the entire power generation device group and individual power generation devices. As a result, this difference is reflected in each item of output limitation information. Accordingly, the equitability of output limitation among power generation devices can be Improved if each power generation device limits output on the basis of these items of output limitation information.

Processing unit B1 determines, for each power generation device that belongs to a power generation device group, output limitation information on the basis of the first index and the second index such that the state difference decreases.

As a result, if each power generation device limits output on the basis of these items of output limitation information, the difference in output limitation among power generation devices decreases, and the equitability of output limitation among power generation devices can be improved.

When the output limitation amount that is requested of a power generation device group is fixed over an output limitation time slot, processing unit B1 determines, for each power generation device, output limitation information that increases the alteration range of the maximum-value power generation amount of the power generation device in proportion to the increase of the difference between the first index and the second index such that the state difference decreases.

As a result, if each power generation device limits output on the basis of these items of output limitation information, the equitability of output limitation among the power generation devices can be improved with high accuracy.

A modification of the present exemplary embodiment is next described.

Control device B may also control the power generation devices on the basis of output limitation information that has been determined by processing unit B1.

Figure 2C:
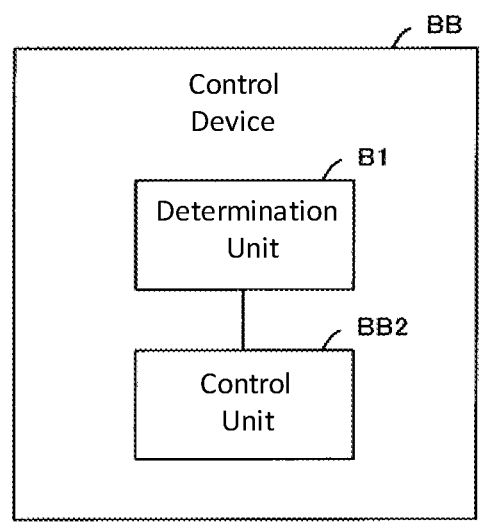
FIG. 2C shows a modification of the second exemplary embodiment of the present invention.

FIG. 2C shows an example of control device BB that controls power generation devices on the basis of the output limitation information that is determined by processing unit B1. In FIG. 2C, constituent elements that are identical to elements shown in FIG. 2A are given the same reference number.

Control device BB includes processing unit B1 and control unit BB2.

Control unit BB2 controls power generation devices that correspond to the output limitation information on the basis of the output limitation information that was determined by processing unit B1. For example, for each item of output limitation Information that was determined by processing unit B1, control unit BB2 directly controls the power generation device that corresponds to that item of output limitation information.

The method of controlling individual power generation devices using the output limitation information in control unit A2 that was described in the first exemplary embodiment is used as the method of controlling each individual power generation device using the output limitation information in control unit BB2.

For example, control device BB that is provided in an external device creates output limitation information (an example of output control Information) of each power generation device on the basis of the first index and the second index for each power generation device.

The external device that has control device BB then directly controls the plurality of power generation devices on the basis of the output limitation Information. Essentially, an external device that is equipped with control device BB controls the output of the plurality of power generation devices from a distance.

According to this modification, control device BB is able to directly control each power generation device.

Third Exemplary Embodiment

Figure 3:
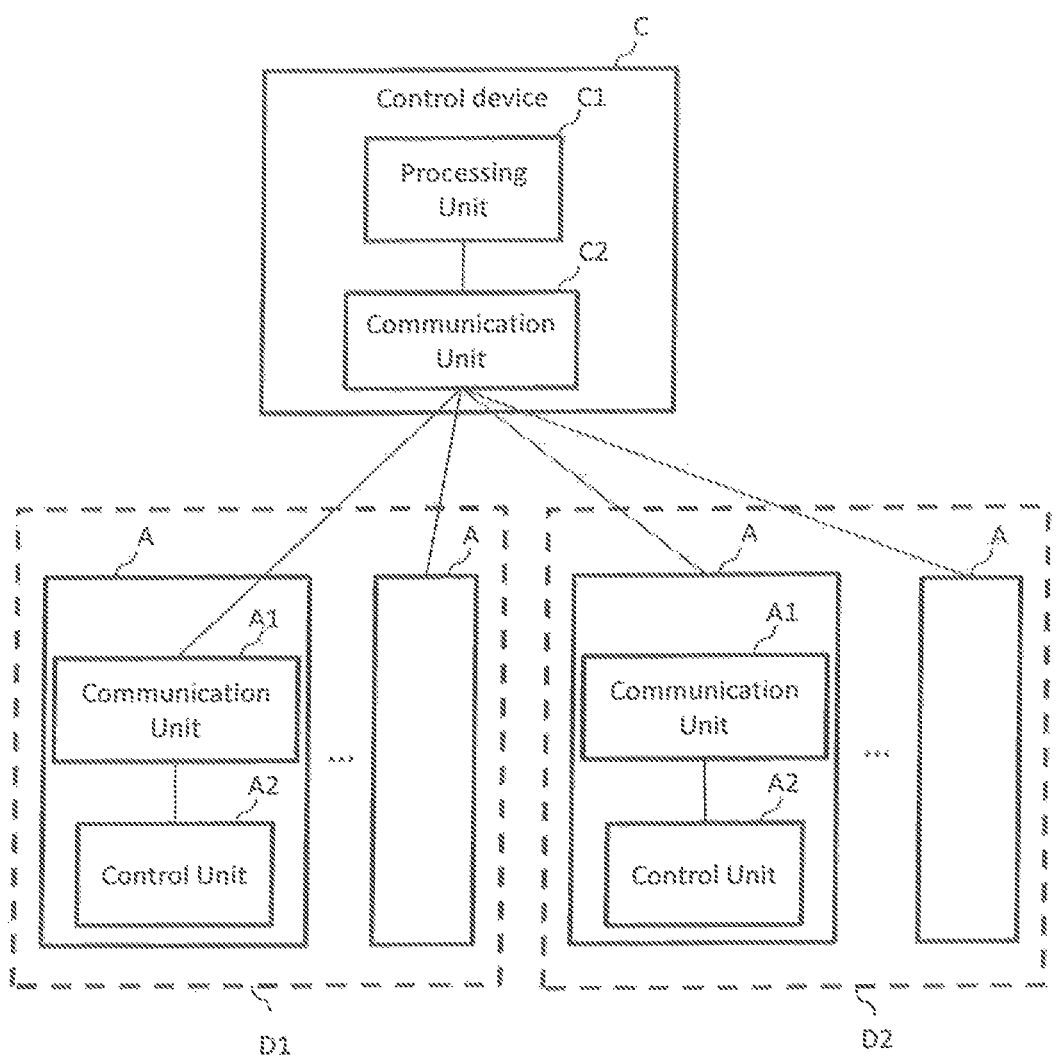
FIG. 3 shows the third exemplary embodiment of the present invention.

FIG. 3 shows the control system of the third exemplary embodiment of the present invention. In FIG. 3, constituent elements that are Identical to elements shown in FIG. 1A are given the same reference numbers.

This control system includes a plurality of power generation control devices A and control device C.

The plurality of power generation control devices A are divided into a plurality of groups. In the present exemplary embodiment, the plurality of power generation control devices A are divided into two groups: First group D1 and second group D2. The number of groups is not limited to "two" but should be a plurality.

Each of power generation control devices A that belongs to first group D1 uses a PV device as the control-object power generation device. On the other hand, each of power generation control devices A that belongs to second group D2 uses a WT device as the control-object power generation device.

The plurality of PV devices (hereinbelow referred to as simply "PV device group") that are used in the first group and the plurality of WT devices (hereinbelow referred to as simply "WT device group") that are used in the second group are each examples of a power generation device group.

Further, the power generation device group used in the first group and the power generation device group used in the second group preferably belong to mutually different categories of renewable energy power sources (in the present exemplary embodiment, photovoltaic generation devices and wind power generation devices). However, the power generation device group used in the first group and the power generation device group used in the second group may also belong to the same category of power sources.

In the present exemplary embodiment, the output limitation information of the "PV device groups" and "WT device groups" that are of different categories is determined such that the difference in limitation among the "PV device groups" and "WT device groups" is decreased.

In the present exemplary embodiment, the first index and the second index are separately used for each category of renewable energy power source, i.e., for each of the PV device groups and WT device groups. As an example, the first index and the second index that were described in the first exemplary embodiment and the second exemplary embodiment are used as the first index and the second index. In the following explanation, the first index and the second index in the PV device group are referred to as "first index A," and "second index A," respectively, and the first index and second index in the WT device group are referred to as "first index B," and "second index B," respectively.

Control device C includes processing unit C1 and communication unit C2.

Processing unit C1 determines the output limitation information that pertains to the PV device group on the basis of first index A of the PV device group and second index A of the PV device group. In addition, processing unit C1 determines the output limitation information that pertains to the WT device group on the basis of first index B of the WT device group and second index B of the WT device group.

At this time, processing unit C1 determines each item of output limitation information according to the difference between first index A of the PV device group and first index B of the WT device group.

Communication unit C2 transmits the output limitation information feat was determined by processing unit C1 to power generation control device A that corresponds to the output limitation information.

The operation of the present exemplary embodiment is next described.

Figure 4:
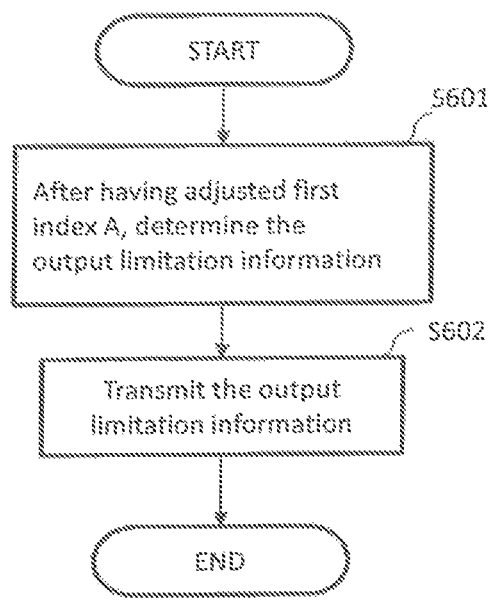
FIG. 4 is a view for describing the operation of the third exemplary embodiment of the present invention.

FIG. 4 is a flow chart for describing the operation of the present exemplary embodiment.

In the interest of simplification, each PV device that belongs to the PV device group is here assumed to be a photovoltaic power generation device having a 2-MW contract capacity, and each WT device that belongs to the WT device group is assumed to be a wind power generation device having a 2-MW contract capacity. Each PV device and WT device is not limited to a device having a 2-MW contract capacity and can be altered as appropriate.

Processing unit C1 implements power generation limitation over the PV device group and WT device group in a particular output limitation time slot in which power generation limitation is required, and then compares first index A and first index B in the output limitation time slot that was implemented.

Processing unit C1 then uses first index A, first index B, second index A, and second index B to determine each Item of output limitation information such that the difference between first index A in the output limitation time slot and first index B in that output limitation time slot decreases in the power generation limitation in the next output limitation time slot (Step S601).

For example, when the degree of the output limitation of an entire PV device group that is specified by first index A is greater than the degree of output limitation of an entire WT device group that is specified by first index B, processing unit C1 at the next instance of power generation limitation, having decreased the degree of output limitation borne by the entire PV device group (having adjusted first index A such that the degree of output limitation in the entire PV device group decreases), uses first index A and second index A to determine the output limitation information of each PV device and uses first index B and second index B to determine the output limitation information of each WT device by the method that was described in the first exemplary embodiment or the second exemplary embodiment.

In addition, when the degree of output limitation in the entire PV device group that is specified by first index A is less than the degree of output limitation in the entire WT device group that is specified by first index B, processing unit C1 at the next instance of power generation limitation, having increased the degree of output limitation that is borne by the entire PV device group (having adjusted first index A such that the degree of output limitation in the entire PV device group increases) uses first index A and second index A to implement determination for the output limitation information of each PV device and uses first index B and second index B to implement determination for the output limitation information of each WT device by the method that was described in the first exemplary embodiment or the second exemplary embodiment.

Here, in the above-described adjustment process, processing unit C1 may adjust first index B in place of first index A or may adjust both first index A and first index B.

When the degree of output limitation in the entire PV device group that is specified by first index A is less than identical to the degree (the same degree) of the output limitation in the entire WT device group that is specified by first index B, processing unit C1 uses first index A and second index A for the output limitation information of each PV device and uses first index B and second index B for the output limitation information of each WT device without adjusting each index to implement determination by the method that was described in the first exemplary embodiment or the second exemplary embodiment.

Communication unit C2 next transmits the output limitation information that was determined by processing unit C1 to power generation control device A that corresponds to the output limitation information (Step S602).

The method of limiting the output of a power generation device (PV device and WT device) on the basis of the output limitation information in power generation control device A is the same as the method described in the first exemplary embodiment.

The effect of the present exemplary embodiment is next described.

Processing unit C1 determines each item of output limitation information in accordance with the difference between first index A of the PV device group and first index B of the WT device group.

First index A of the PV device group indicates the degree of output limitation in the entire PV device group, and first index B of the WT device group indicates the degree of output limitation in the entire WT device group. As a result, the difference of each first index means the difference of the degree of output limitation between the entire PV device group and the entire WT device group.

Accordingly, by determining each item of output limitation information in accordance with the difference of each first index, each item of output limitation information can be determined according to the difference of the degree of output limitation between the PV device group and the WT device group and equitability among renewable energy power sources of different categories can be improved. As a result, power generation limitation can be implemented with a high degree of equitability without regard to the type of power generation device.

A modification of the present exemplary embodiment is next described.

In the present modification, processing unit C1 determines each item of output limitation information on the basis of the difference of the total power generation amount between two power generation device groups during a reference interval (for example, one year) under circumstances in which power generation is not limited.

For example, processing unit C1 in power generation limitation in the next output limitation time slot, uses first index A, first index B, second index A and second index B to determine each item of output limitation information such that the difference between first index A in an output limitation time slot and first index B in that output limitation time slot decreases within a range that is equal to or greater than a predetermined reference value that accords with the above-described difference of the total power generation amount.

As an example, when the power generation device group that is used as the first group and die power generation device group that is used as the second group belong to the same category regarding power sources, the following case can be considered.

For example, the identical category is assumed to be photovoltaic power generation sources. The first group is assumed to be, for example, a photovoltaic power generation group of cluster 1 (Niigata prefecture) and the second group is assumed to be a photovoltaic power generation group of cluster 2 (Miyazaki prefecture). In this case, under circumstances in which power generation limitation is not implemented, there is a possibility that the annual power generation amount may differ for cluster 1 and cluster 2. For example, the annual power generation amount of cluster 1 may be greater than for cluster 2.

At this time, when control is implemented by index setting that is similar to feat of the third exemplary embodiment such that the equitability of output limitation is improved between cluster 1 and cluster 2, processing unit C1 implements control in which, rather than simply lessening the difference between first index A and first index B, the difference between first index A and first index B is permitted up to a particular value.

In this example, processing unit C1 implements control such that the amount of limitation and the limitation proportion of cluster 1 compared to cluster 2 is lessened. It thus becomes possible to improve equitability that also takes into consideration regional differences of the annual power generation amount (equivalent to the facility utilization rate).

Fourth Exemplary Embodiment

Figure 5:
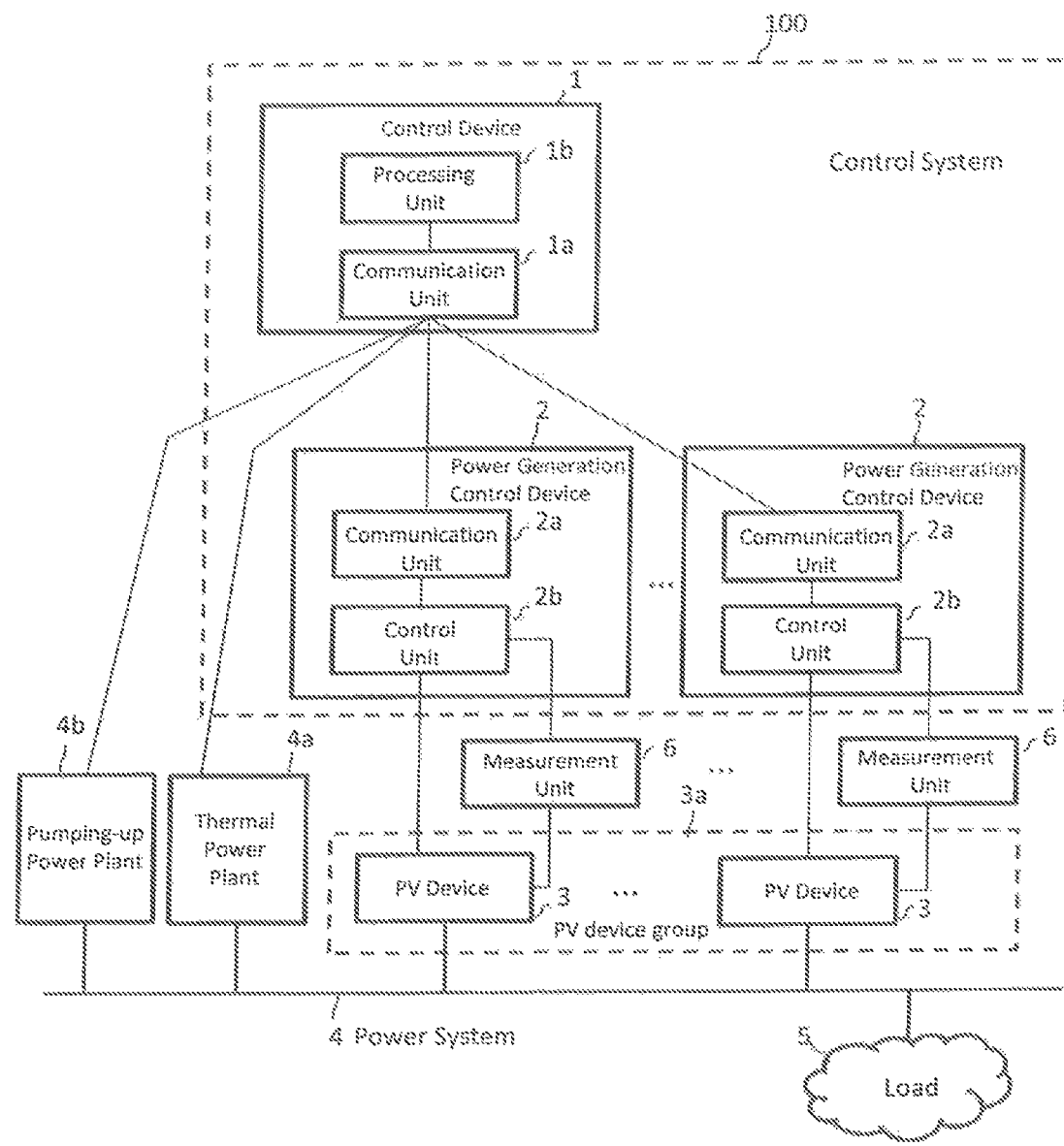
FIG. 5 shows control system 100 of the fourth exemplary embodiment of the present invention.

FIG. 5 shows control system 100 of the fourth exemplary embodiment of the present invention.

Control system 100 includes control device 1 and a plurality of power generation control devices 2. Control system 100 controls a plurality of PV (photovoltaic power generation) devices 3 that correspond to a plurality of power generation control devices 2. Although FIG. 5 shows an example in which power generation control devices 2 have a one-to-one correspondence with PV devices 3, the correspondence relation between power generation control devices 2 and PV devices 3 is not limited to a one-to-one relation and may also be altered as appropriate to a one-to-two or one-to-multiple relation.

PV device 3 is an example of a power generation device and a renewable energy power source, PV device group 3a that is made up of a plurality of PV devices 3 is an example of a power generation device group.

The power generation devices are not limited to PV devices 3 and can be altered as appropriate. For example, WT (wind power generation) devices may also be used as the power-generation devices.

In addition, a portion of the PV devices 3 in PV device group 3a may also be converted to power generation devices other than PV devices 3 (for example, WT devices).

Each PV device 3 is connected to power system 4.

In the present exemplary embodiment, the maximum-value power that is supplied by each PV device 3 to power system 4 is determined by a contract beforehand. The maximum value of the output electric power that is determined by the contract is hereinbelow also referred to as "contract capacity [W]".

Each PV device 3 includes a photovoltaic panel that converts solar light into direct current (electricity) and a PCS (Power Conditioning System). The PCS converts the direct-current power from the photovoltaic panel to alternating-current power, and further, adjusts the level of this alternating current power.

Power system 4 includes thermal power plant 4a and pumping-up power plant 4b. Load 5 is also connected to power system 4. In FIG. 5, load 5 is indicated as virtual load (customers) in which a plurality of equipment (devices that generate electric power demand) that consume the electric power that is supplied from power system 4 are virtually combined. In the present exemplary embodiment, it is assumed that renewable energy power sources (not shown) other than PV devices 3 (for example, WT devices or geothermal power generation) or a nuclear power plant (not shown) and hydraulic power plant (not shown) are also connected to power system 4.

Control device 1 is under the control of a manager (for example, a power company) that manages the balance between power supply and demand in power system 4. Further, the manager that manages the balance between electric power supply and demand is not limited to a power company and can be altered as appropriate. In the present exemplary embodiment, control device 1 is assumed to be under the management of a power company.

Control device 1 includes communication unit 1a and processing unit 1b.

Communication unit 1a communicates with each power generation control device 2, thermal power plant 4a, and pumping-up power plant 4b.

Communication unit 1a carries out communication, for example, as shown below.

Communication unit 1a receives the actual power generation amounts of thermal power plant 4a and pumping-up power plant 4b. Communication unit 1a sends instructions relating to power generation to thermal power plant 4a. Communication unit 1a sends instructions relating to power generation or pumping-up operations (the operations of pumping up by pumping the water that is used in power generation) to pumping-up power plant 4b.

Communication unit 1a receives from each power generation control device 2 the power generation amount of PV device 3 that corresponds to power generation control device 2. Communication unit 1a supplies the power generation amount of PV device 3 to processing unit 1b.

Communication unit 1a sends output limitation information that controls the output limitation of each PV device 3 that was determined by processing unit 1b to power generation control device 2 that corresponds to the PV device 3 that is the object of the output limitation information.

Processing unit 1b is an example of a determination unit.

Processing unit 1b determines the output limitation information of each PV device 3 to establish power supply/demand balance in power system 4.

Processing unit 1b receives the actual power generation amount (hereinbelow referred to as the "power generation performance amount") of each PV device 3 from communication unit 1a.

Processing unit 1b determines a first index that relates to the output limitation state in PV device group 3a on the basis of the power generation performance amount of each PV device 3a and a second index that relates to the output limitation state in each PV device 3.

Processing unit 1b determines the output limitation information for each PV device 3 on the basis of the first index and the second index of the PV device 3.

A plurality of power generation control devices 2 and a plurality of PV devices 3 are under the control of a plurality of PPS. Each PPS may manage one power generation control device 2 or may manage a plurality of power generation control devices 2.

Each PV device 3 that corresponds to each power generation control device 2 is an example of the predetermined power generation device. As a result, a predetermined power generation device exists for each power generation control device 2. The power generation performance amount of each PV device 3 is measured by measurement unit 6 that corresponds to PV device 3. Measurement unit 6 is, for example, a smart meter. PV device 3 may further include measurement unit 6.

Each power generation control device 2 includes communication unit 2a and control unit 2b. Each power generation control device 2 may also include measurement unit 6.

Communication unit 2a communicates with control device 1.

Communication unit 2a sends the power generation performance amount of PV device 3 that was measured by measurement unit 6 to control device 1. Communication unit 2a receives the output limitation information from control device 1. As for the form of the reception of output limitation information, a form can be offered in which power generation control device 2 passively receives the output limitation information that is push-transmitted from control device 1, and a form can be offered in which power generation control device 2 receives the output limitation information by actively polling control device 1 (requesting the output limitation information).

Control unit 2b controls the output of PV device 3 on the basis of the output limitation information.

Further, power generation control device 2 may also be Incorporated in a corresponding PV device 3. PV device 3 that incorporates power generation control device 2 is an example of a power generation apparatus or a power generation device.

The operation is next described.

Figure 6:
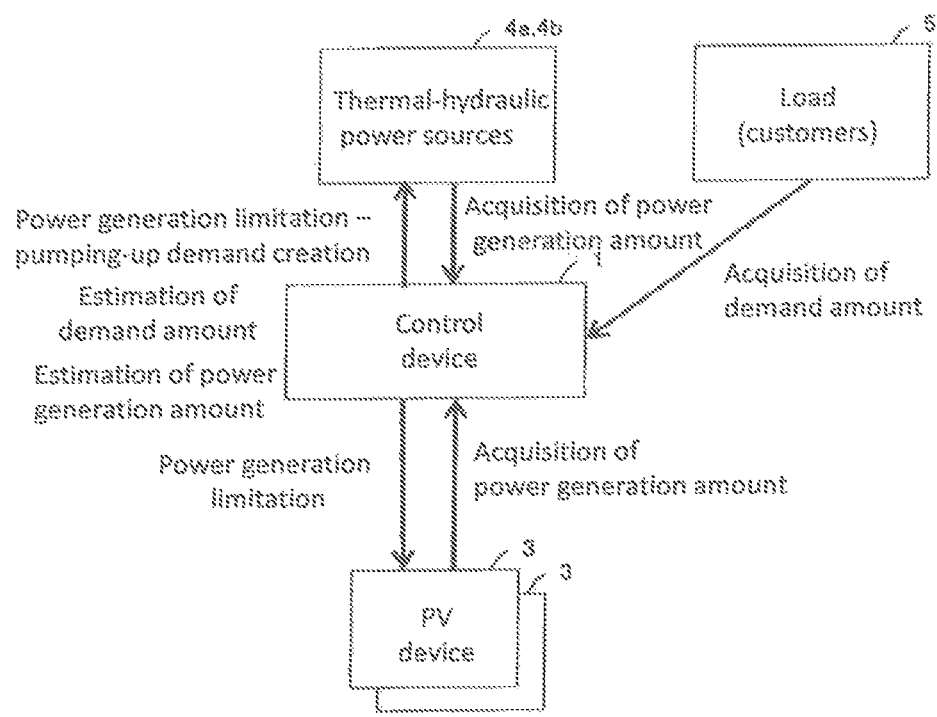
FIG. 6 is a view for describing the operation of control system 100.

FIG. 6 is a view for describing the operation of control system 100. In FIG. 6, a thermal power plant and a pumping-up power plant are represented consolidated together as "thermal-hydraulic power source" and power generation control device 2 is omitted.

Figure 7:
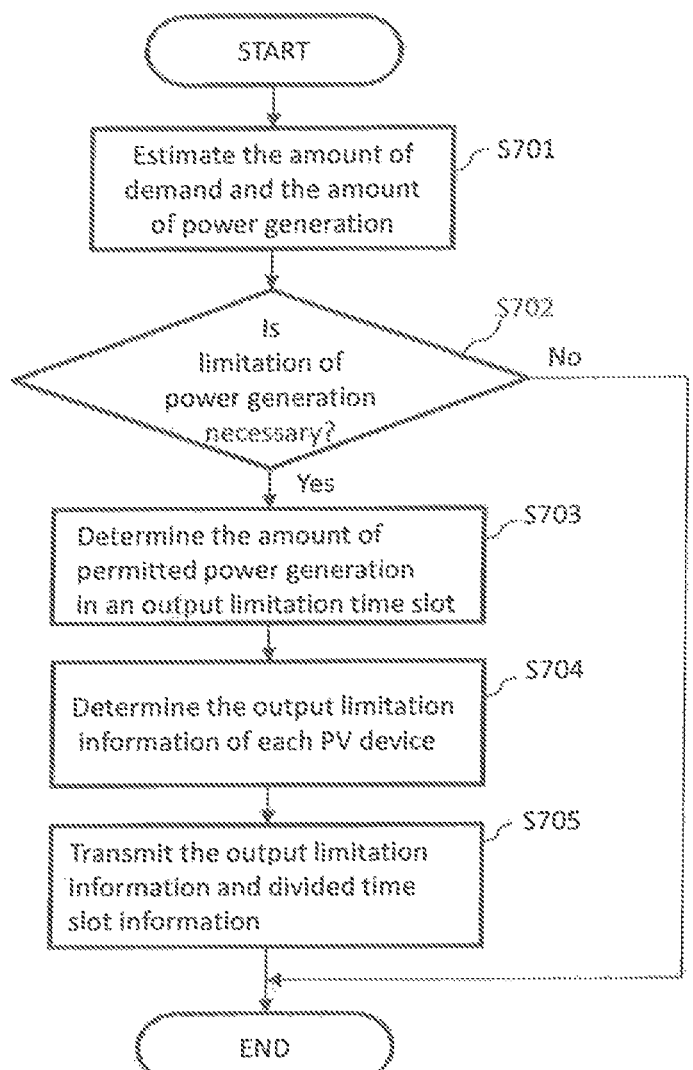
FIG. 7 is a flow chart for describing the operation of control system 100.

The operation of start time of limitation by means of control system 100 is first described, FIG. 7 is a flow chart for describing the operation of the limitation start time by control system 100.

Processing unit 1b of a power company estimates at, for example, 9:00, the demand amount of all customers (load 5) under its jurisdiction of power system 4 and the power generation amount of renewable energy power sources that include all PV devices 3 for the time slot of from 0:00 until 24:00 of the following day (Step S701). The time of estimation Is not limited to 9:00 and can be altered as appropriate.

In order to estimate the demand amount of all customers and estimate the power generation amount of renewable energy power sources, processing unit 1b must acquire forecast values of meteorological information such as the weather, temperature, humidity, and wind speed as necessary information, but the route and acquisition source are not indicated in FIG. 5. The meteorological information can be acquired from, for example, the Meteorological Agency.

Figure 8:
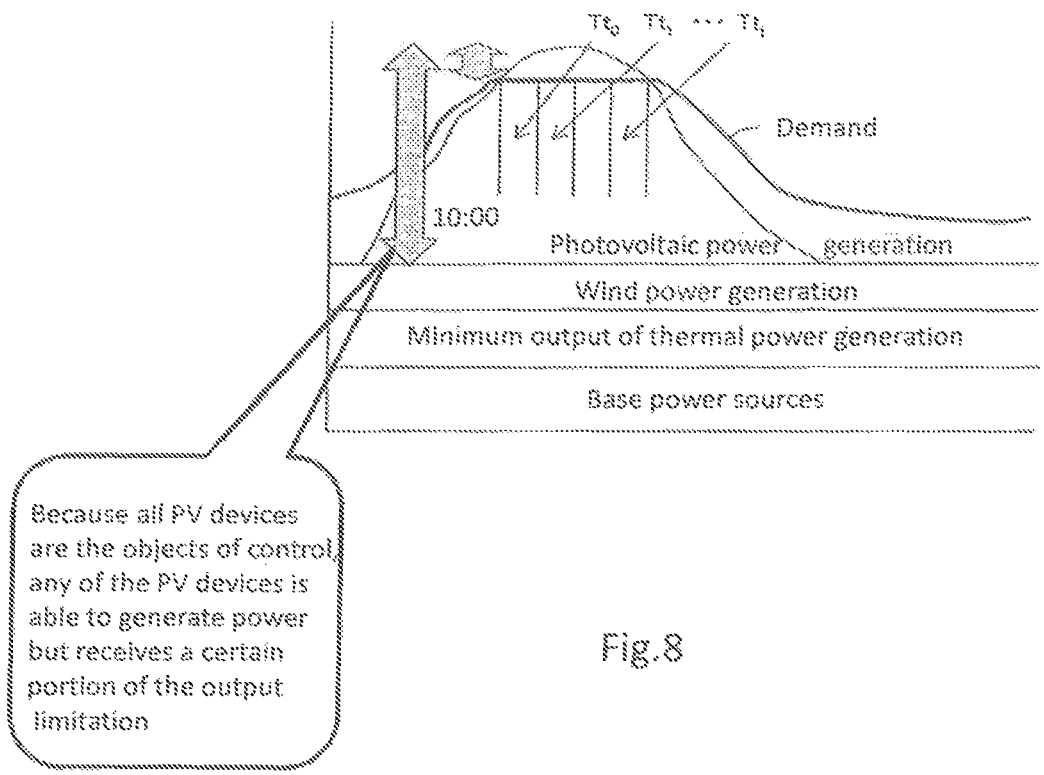
FIG. 8 shows the power supply and demand relation.

FIG. 8 shows the power supply/demand relation of the time slot of from 0:00 to 24:00 of the following day that takes into consideration the estimation result of Step S701.

In order to realize a stable supply of electric power, the power supply amount (power generation amount) must be limited in time slots in which the power supply amount (power generation amount) exceeds the power demand amount.

In a power system that Is connected to renewable energy power source such as PV devices, when the electric power supply amount realized by renewable energy power sources is to be limited, the power supply amount from other than renewable energy power sources must first be limited in accordance with priority power supply stipulations.

Here, in the power supply/demand state shown in FIG. 8, it is assumed that the generation of surplus power originating from PV devices 3 after 10:00 will be predicted even after limiting the output of, for example, thermal power generation or by creating demand by the pumping up (pump operation) of pumping-up power generation. As a result, processing unit 1b judges that output limitation (power generation limitation) in PV devices 3 is necessary (Step S702). Alternatively, if the occurrence of surplus power originating from PV devices 3 is not predicted, processing unit 1b judges that output limitation in PV devices 3 is not necessary (Step S702).

When the output limitation in PV devices 3 is necessary, processing unit 1b determines to implement output limitation of PV devices 3.

The output limitation of PV devices 3 is implemented by a procedure such as described below.

Processing unit 1b first reconfirms whether output limitation in PV devices 3 is necessary on the basis of estimation or the trend of the power supply and power demand of the day of limitation.

An example of the method of reconfirming is next described.

On the day of limitation, processing unit 1b monitors the power demand trend based on both the measured value of the power demand amount of all customers (load 5) (updated, for example, every 30 minutes) and the predicted value. Here, the measured value of the power demand amount of all customers (load 5) is transmitted to control device 1 from the power meters (for example, smart meters) of each customer. The interval of updating the measured value of the power demand amount of all customers (load 5) is not limited to 30 minutes and can be altered as appropriate.

In addition, processing unit 1b also monitors the trend of power supply on the basis of measurement values of power generation amount for renewable energy power sources such as PV devices as well as the estimated values for power sources that lack measurement instruments.

Processing unit 1b judges whether surplus electric power is generated originating in PV devices 3 on the basis of the trend or estimation of power demand and power supply. This judgment corresponds to reconfirmation.

This judgment is carried out continuously, for example, every 30 minutes on the day in question (the update interval of the judgment is not limited to 30 minutes, and can be altered as appropriate to a time interval longer or shorter than 30 minutes).

Processing unit 1b, upon judging that surplus power originating in PV devices 3 has not occurred, does not execute output limitation of PV devices 3. On the other hand, upon judging that surplus power originating in PV devices 3 has occurred, processing unit 1b executes output limitation of PV devices 3.

The operation when it is determined as a result of the reconfirmation to execute output limitation of PV devices 3 is next described. As an example of this operation, operation is described in the following explanation for a case of determining at the time 9:30 on the day in question that there is a high possibility of generating surplus power originating from PV devices 3 in the time slot from 10:00 until 15:00. In this ease, the time slot of from 10:00 until 15:00 becomes the "output limitation time slot".

Processing unit 1b determines to implement power generation limitation of the form of maintaining the output power of PV device group 3a at the time point 10:00 during the subsequent time slot up to 15:00 (output limitation time slot) (Step S703).

Here, the output power amount of PV device group 3a at the time point 10:00 is an example of the power generation permitted amount (output limitation amount) in an output limitation time slot. In this power generation limitation, the power generation permitted amount (output limitation amount) that is requested of PV device group 3a is fixed over the output limitation time slot (10:00-45:00).

Processing unit 1b next divides the five-hour time slot from 10:00 to 15:00 for each hour to determine divided time slots $Tt_j$. The divided time slots from 10:00 in this instance are $Tt_0$, $Tt_1$, $Tt_2$, $Tt_3$ and $Tt_4$. The length of the divided time slots is not limited to one hour and can be altered as appropriate.

Next, processing unit 1b determines the power generation output limitation in all (a total N) PV devices 3 that belong to PV device group 3a beginning with divided time slot $Tt_0$ (the time slot from 10:00 to 11:00). Each of the total number N of PV devices 3 is hereinbelow referred to as PV device 3n (where n is 1-N).

In this instance, power generation output limitation Is implemented in which the power generation amount of PV device group 3a in divided time slot $Tt_0$ is maintained at the power generation amount (for example, $P_{10:00}$) of PV device group 3a at the time point 10:00.

Processing unit 1b determines that the initial Individual index $P'_{0,n}=0.3$ at thirty minutes before 10:00 (9:30) (Step S704). The method of determining $P'_{0,n}=0.3$ will be described later.

Processing unit 1b next distributes the initial individual index $P'_{0,n}=0.3$ and divided time slot information $I_0$ that indicates divided time slot $Tt_0$ from communication unit 1a to each power generation control device 2 (Step S705). In the initial individual index $P'_{0,n}$, "0" corresponds to divided time slot $Tt_{j(j=0)}$, and "n" corresponds to the "n" of PV device 3n.

Here, the timing of determining the initial individual index $P'_{0,n}=0.3$ is not limited to thirty minutes before the starting time of the divided time slot $Tt_0$. This timing can be altered as appropriate on the condition that the transmission timing of initial individual index $P'_{0,n}=0.3$ and divided time slot information $I_0$ precedes the starting time of divided time slot $Tt_0$.

In each power generation control device 2S when control unit 2b receives initial individual index $P'_{0,n}=0.3$ and divided time slot information $I_0$ by way of communication unit 2a, control unit 2b holds the initial Individual index $P'_{0,n}=0.3$ and divided time slot information $I_0$.

Figure 9:
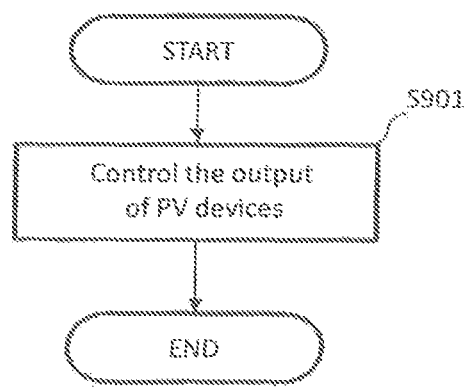
FIG. 9 is a flow chart for describing the operation of power generation control device 2.

FIG. 9 is a flow chart for describing the operation of power generation control device 2 that has received the Initial individual index $P'_{0,n}=0.3$ and divided time slot information $I_0$.

Upon commencement of the starting time (in this case 10:00) indicated by the divided time slot information $I_0$, control unit 2b sets the maximum-value power generation amount of corresponding PV devices 3 to a power generation amount (=the maximum-value power generation amount $W_0''$ [W] in divided time slot $Tt_0$) obtained by multiplying the contract capacity [W] of the PV device 3 by the initial individual index $P'_{0,n}=0.3$. Control unit 2b next controls the output power amount of corresponding PV devices 3 such that the output power amount of corresponding PV devices 3 does not exceed the maximum-value power generation amount $W_0''$ [W] (Step S901).

For example, control unit 2b controls PCS in corresponding PV devices 3 to control the output power amount of corresponding PV devices 3 such that the output power amount of corresponding PV devices 3 does not exceed the maximum-value power generation amount $W_0''$ [W].

Control unit 2b repeats Step S901 at period T2 (where T2 is on the order of 0.4 seconds) until the end time indicated by the divided time slot Information $I_0$ (in this case, until 11:00). Period T2 is equal to or less than the time length of the divided time slot (in this example, one hour). Period T2 can be altered as appropriate within a range less than or equal to the time duration of the divided time slot, but a time length sufficiently shorter than the divided time slot improves the control accuracy and is therefore preferable.

Even if the output of each PV device 3 is limited by the common individual Index $P'_{0,n}=0.3$, variation may possibly occur in the output of each PV device 3 due to weather conditions. This variation influences the performance of the output limitation.

In control device 1, on the other hand, processing unit 1b continuously collects power generation amount information that indicates the power generation performance amount of each PV device 3 from communication unit 2a of each power generation control device 2 at period T3 (where T3 is on the order of 30 minutes and T2<T3<the time length of the divided time slot). Taking into consideration the control accuracy, period T3 is preferably no greater than ¹⁄₁₀ the time length of the divided time slot.

In the present exemplary embodiment, the following two individual indices are assumed.

The first is planned individual index that determines a schedule value of power generation limitation (a value that determines the degree of power generation limitation) for a particular divided time slot $Tt_j$. The above-described initial individual index $P'_{0,n}=0.3$ also comes under the category of a planned individual index.

The second individual index is performance individual index $P_{j,n}$ that recalculates the schedule value by the actual power generation performance of power generation limitation in a particular divided time slot $Tt_j$. These two individual indices (the planned individual index and the performance individual index) are distinguished by the presence or absence of a dash.

Of the planned individual indices, a planned individual index other than an Initial individual index is an example of output limitation information.

A performance individual index is an example of the second index.

The above-described initial individual index $P'_{0,n}=0.3$ is derived, for example, as shown below.

A state in which surplus power originating in PV devices 3 will occur after 10:00 is predicted at the time point 8:00, and when the generated power at 10:00 is predicted at the time point 9:00, the total generated power α in PV device group 3a is predicted and it is judged that, because the total generated power in PV device group 3a will surpass total generated power α after 10:00, a state will occur in which there is surplus power. As a result, it is understood that the total generated power in PV device group 3a must be maintained at total generated power α after 10:00.

Under these circumstances, the value calculated by dividing the value of power α by the total contract capacity of PV device group 3a is $0.3(=P'_{0,n})$.

The maximum-value power generation amount of PV devices 3 is a power generation amount obtained by multiplying the initial individual index $P'_{0,n}=0.3$ by the contract capacity [W] of PV devices 3. As a result, the output of PV devices 3 is limited in proportion to smaller values of initial individual index $P'_{0,n}$.

The operation following the starling time of limitation by control system 100 is next described.

Here, a number of parameters are defined as shown below.

$M_n$: Contract capacity [W] of PV device 3n $T_j$: Limitation time slot $Gj \geq 0$: The total power generation amount [W] of PV device group 3a that is permitted in limitation time slot $T_j$ $W_j^n \geq 0$: The maximum-value power generation amount in limitation time slot $T_j$ of PV device 3n Processing unit 1b generates the past performance curve $PV^n(t)$ of the power generation amount of each PV device 3 in the limitation time slot $T_0$ of 10:00-10:30 $T_0$ was originally 10:00-11:00, but taking into consideration the information gathering and processing time, the value 10:00-10:30 is used as a representative value in the calculation of the index for the time slot $T_0$ below). The performance carve $PV^n(t)$ is generated from the power generation performance amount of each PV device 3.

At this time, the actual power generation amount of PV device 3n in limitation time slot $T_0$ is:

$$\int_{T_0} PV^n(t)dt \quad \text{[Numerical Expression 1]}$$

In the next divided time slot $Tt_0$, processing unit 1b uses the reference index $P_1$ that is determined by the following Numerical Expression 2. Here, the reference index is an example of the first index.

$$P_1 := \frac{\sum_{n=1}^{N} \int_{T_0} PV^n(t)dt}{\sum_{n=1}^{N} M_n |T_0|} \quad \text{[Numerical Expression 2]}$$

This index ($P_1$) indicates the average of the actual output with respect to the rated output of all PV devices 3 (PV device group 3a).

Processing unit 1b may also use Numerical Expression 3 as another reference index:

$$P_1 := \frac{1}{N} \sum_{n=1}^{N} \frac{\int_{T_0} PV^n(t)dt}{M_n |T_0|} \quad \text{[Numerical Expression 3]}$$

that is equivalent to the normal arithmetic average.

On the other hand, processing unit 1b uses performance individual index $P_{0,n}$ that is determined by the following Numerical Expression 4:

$$P_{0,n} := \frac{\int_{T_0} PV^n(t)dt}{M_n |T_0|}. \quad \text{[Numerical Expression 4]}$$

Here, the ratio of the actual power generation amount of PV device group 3a when the power generation of each PV device 3n is limited at the maximum-value power generation amount $W_1^n$ in limitation time slot $T_1$ with respect to the power generation amount of PV device group 3a that would be generated when output limitation is not applied in limitation time slot $T_1$ is assumed to be, approximately, the following $Q_{1,n}$:

$$Q_{1,n} := \frac{W_1^n |T_1|}{M_n |T_1|} = \frac{W_1^n}{M_n}. \quad \text{[Numerical Expression 5]}$$

Processing unit 1b then determines each $W_1^n$ such that the divergence of performance individual index $P_{0,n}$ from reference index $P_1$ is minimized while correcting the gap in the performance individual index $P_{0,n}$ among PV devices 3 in the elapsed time slot (in this case, limitation time slot $T_0$) among the limitation time slots.

If represented in the form of an optimization problem, processing unit 1b takes $W_1^1, \ldots, W_1^n$ that are obtained by solving the two equations:

$$\min_{W_1^1, \ldots, W_1^n} \sum_{n=1}^{N} (Q_{1,n} - P_1 + P_{0,n} - P_1)^2 \quad \text{[Numerical Expression 6]}$$

$$\sum_{n=1}^{N} W_1^n \leq G_1 \quad \text{[Numerical Expression 7]}$$

as maximum-value power generation amount $W_1^n$ of each PV device 3n in the next divided time slot $Tt_1$.

In the next divided lime slot $Tt_j$, processing unit 1b distributes, from communication unit 1a to corresponding power generation control device 2, the planned individual index $P'_{1,n}$ that is a value obtained by dividing maximum-value power generation amount $W_1^n$ by the contract capacity $M_n$ and divided time slot information Is that indicates divided time slot $Tt_j$.

Then, in each power generation control device 2, upon receiving planned individual index $P'_{1,n}$ and divided time slot information $I_T$ by way of communication unit 2a, control unit 2b discards the past planned individual index and past divided time slot information and holds the most recent planned individual index $P'_{1,n}$ and divided time slot information $I_1$. At 11:00, control unit 2b effects real-time control at period T2 of corresponding PV devices 3 such that the maximum-value power generation amount of corresponding PV devices 3 is a power generation amount obtained by multiplying planned individual index $P'_{1,n}$ by the contract capacity [W] (=maximum-value power generation amount $W_1^n$ in divided time slot $T_1$). The operation of this power generation control device 2 conforms to the operation shown in FIG. 9.

On the other hand, control device 1 continuously collects information indicating the power generation amount of each PV device $3n$ at period T3.

Processing unit 1b subsequently calculates:

$$\int_{T_1} PV^n(t) dt \qquad \text{[Numerical Expression 8]}$$

to find the actual power generation amount of PV devices 3 in limitation time slot $T_1$ of 10:30-11:30.

Processing unit 1b uses reference Index $P_2$ that is determined by the following Numerical Expression 9 in the next divided time slot $Tt_2$.

$$P_2 := \frac{\sum_{n=1}^{N} \int_{T_1} PV^n(t) dt}{\sum_{n=1}^{N} M_n |T_1|} \qquad \text{[Numerical Expression 9]}$$

Processing unit 1b further uses performance individual index $P_{1,n}$ that is determined by the following Numerical Expression 10.

$$p_{1,n} := \frac{\int_{T_1} PV^n(t) dt}{M_n |T_1|} \qquad \text{[Numerical Expression 10]}$$

Processing unit 1b next defines:

$$Q_{2,n} := \frac{W_2^n |T_2|}{M_n |T_2|} = \frac{W_2^n}{M_n} \qquad \text{[Numerical Expression 11]}$$

as with, the previous time slot.

Processing unit 1b then determines each WA such that the divergence of the performance individual index $P_{0,n}$ and performance individual index $P_{1,n}$ from reference index $P_1$ and reference index $P_2$ is minimized.

In other words, in this instance of limitation, having taken into account the actual divergence in all past time slots, processing unit 1b carries out optimum distribution of limitation from the standpoint of guaranteeing equitability among all time slots that are subject to limitation.

As a result, processing unit 1b takes, as the maximum-value power generation amount $W_2^n$ of each PV device $3n$ in the next divided time slot $Tt_2$, $W_2^1, \ldots, W_2^n$ that are obtained by solving the two equations:

$$\min_{W_2^1, \ldots, W_2^n} \sum_{n=1}^{N} \qquad \text{[Numerical Expression 12]}$$

$$(Q_{2,n} - P_2 + P_{1,n} - P_2 + P_{0,n} - P_1)^2$$

$$\sum_{n=1}^{N} W_2^n \leq G_2. \qquad \text{[Numerical Expression 13]}$$

The process described above is then repeated.

If the above-described process of determining the maximum-value power generation amount is expressed generally, processing unit 1b takes, as the maximum-value power generation amount $W_j^n$ of each PV device $3n$ in the next divided time slot $Tt_j$, $W_j^1, \ldots, W_j^n$ that are obtained by solving the two equations:

$$\min_{W_j^1, \ldots, W_j^n} \sum_{n=1}^{N} \left( Q_{J,n} - P_J + \sum_{j=1}^{J} (P_{j-1,n} - P_j) \right)^2 \qquad \text{[Numerical Expression 14]}$$

$$\sum_{n=1}^{N} W_J^n \leq G_J. \qquad \text{[Numerical Expression 15]}$$

For the last divided time slot $Tt_4$, processing unite 1b finds the value that corresponds to reference index $P_6$ and the value that corresponds to performance individual index $P_{5,n}$ in preparation for this time slot end time (15:00) and the next day's and subsequent limitation. At this time, the time interval 14:00-15:00 is used as the limitation time slot $T_5$ used in the index calculation.

However, due to solar insolation conditions, for example, during times of cloudiness, each PV device $3n$ will not necessarily be able to achieve the power generation of the maximum-value power generation amount and will only achieve power generation of a value less than maximum value, but control is carried out that, to the greatest extent possible, takes the maximum-value power generation amount as the maximum value.

The effect of the present exemplary embodiment is next described.

In the present exemplary embodiment, feedback control is repeated that uses $P_J$, $P'_{J,n}$ and $P_{J,n}$.

The opportunities for power generation limitation are considered to be multiple and not just one time in a year, and as a result, through the plurality of days in which this limitation is required, increasingly equitable limitation among PV devices 3 can be implemented with increases in the number of instances in which the above-described feedback control Is repeated.

In this method, although conditions such as the weather and temperature may change for each PV device 3 in power generation limitation time slots, PV devices 3 that have power sources of the same rating (or contract capacity) are subjected to feedback control so that they have the same power generation amount (power generation limitation amount).

Due to this type of limitation, power generation limitation is possible that maintains equitability among PV devices 3.

A modification of the present exemplary embodiment is next described.

In the present exemplary embodiment, an example was shown in which data collection interval T3=30 minutes, but a case can also be supposed in which the power generation data can be collected with high frequency according to the information communication environment.

For example, when T3=5 minutes, limitation time slot $T_0$ is 10:00-10:55, and processing unit 1b determines $P_j$ and $P_{j,n}$ in the next divided time slot $Tt_1$ by the power generation data of every five minutes of this interval. Further, limitation time slot $T_1$, is 10:55-11:55, and processing unit 1b determines $P_j$ and $P_{j,n}$ in the next limitation time slot $Tt_2$ by the power generation data of every five minutes in this interval. The algorithm of this determination can be flexibly changed according to change of the relation between the time interval of the divided time slot $T_j$ and $T_3$.

In the present exemplary embodiment, an example was shown in which the power generation limitation is determined on the day of limitation, and an equitability index (initial reference index) is distributed from control device 1 to each power generation control device (each PV device 3n) thirty minutes before the limitation starting time of 10:00.

However, a method may be used in which the necessity of limitation is determined beforehand such as a day before, a week before, a month before, or a year before and the schedule on the day of limitation is distributed in advance (for example, a method in which control device 1 distributes a schedule together with a calendar to power generation control device 2, or a method in which control device 1 holds a schedule together with a calendar and each power generation control device 2 goes to control device 1 to fetch information).

For example, under circumstances in which scheduling is carried out each day, when a time slot in which the necessity of limitation is thought to be necessary on a particular day (hereinbelow assumed to be "day A") is 11:00-14:00, processing unit 1b may operate as shown below.

Processing unit 1b sets maximum-value power generation amount $W_j''$ of each PV device 3n at this time to 50% of the contract capacity and actually implements power generation limitation at 11:00-14:00 of day A.

After implementation of power generation limitation, processing unit 1b then carries out the calculation that was carried out on the basis of the one-hour time window (divided time slot) in the third exemplary embodiment by substituting the time window with 11:00-14:00. As a result, feedback is implemented in the determination of the maximum-value power generation amount $W_j''$ in the limitation time slot of the next scheduled limitation day such as the following day. This case results in equitability feedback in day units, and power generation limitation can be implemented that maintains equitability that increases with the increasing number of Instances of limitation. This may be implemented in week units or month units.

In addition, maximum-value power generation amount $W_1''$ can be set to 0% of the contract capacity and the "total number of instances according to limitation" and "total time according to limitation" can be substituted as an index that guarantees equitability. Although this method results in poor accuracy regarding equitability itself, it has the advantage of simplifying the implementation of power generation limitation.

Upon commencement of a limitation implementation time slot, the PCS output may be set to the target value (maximum-value power generation amount $W_1''$), or the PCS output may be changed from the current value to the target value slowly over a time interval on the order of, for example, ten minutes in order to avoid sudden changes in the amount of generated power. This is realized by changing the PCS setting to the target value over a time interval, but this method is effective when the cooperation in power supply/demand adjustment with thermal power generation of the power system is considered (there is concern for the occurrence of a problem regarding the follow-up capability regarding output changes of, for example, thermal power generation when changes in the output of renewable energy power generation are sudden).

The first index and second index described in the first exemplary embodiment and second exemplary embodiment may be used in place of the reference index and performance individual index.

The maximum-value power generation amount $W_j''$ may be used in place of the planned individual index. In this case, corresponding PV devices 3 are subjected to real-time control at period T2 in each power generation control device 2 such that the maximum-value power generation amount of corresponding PV devices 3 is maximum-value power generation amount $W_j''$.

Fifth Exemplary Embodiment

In the fifth exemplary embodiment of the present invention, photovoltaic power generation devices (PV devices) are assumed to be the renewable energy power sources that are of the same category as the control object a plurality of PV devices that are the objects of output limitation are divided into a plurality of groups ("groups" are hereinbelow referred to as "cluster") on the basis of the area and contract capacity, and the output limitation of the PV devices is executed in cluster units.

In the fifth exemplary embodiment, the power generation output of PV devices is controlled at this time such that the equitability of output limitation is realized among a plurality of PV devices having contract capacity in the same capacity mage (for example, 500 kW or more).

In this case, the plurality of PV devices having contract capacity of the same contract capacity range or the plurality of PV devices having contract capacity of the same contract capacity range and within the same area are an example of the plurality of PV devices that belong to a power generation device group. The contract capacity is an example of the predetermined index.

The predetermined index that is used for specifying the plurality of PV devices for which the equitability of output limitation is to be realized is not limited to the contract capacity and can be altered as appropriate.

For example, the rated output or the power generation efficiency of PV devices 3 may be used as the predetermined index.

Alternatively, a dynamic index (for example, the weather conditions of the region in which PV devices 3 are installed, the estimated power generation amount, the past power generation amount, the limitation amount, or the voltage fluctuation of PV devices 3) may be used in place of a fixed index such as the contract capacity, the rated output, and the power generation efficiency.

In the fifth exemplary embodiment, as in the third exemplary embodiment, PV devices are an example of the power generation devices and renewable energy power sources. The power generation devices are not limited to PV devices and can be altered as appropriate. For example, WT devices may also be used as the power generation devices.

In addition, a portion of the plurality of PV devices that belong to the same cluster may be changed to power generation devices other than PV devices (such as WT devices).

Figure 10:
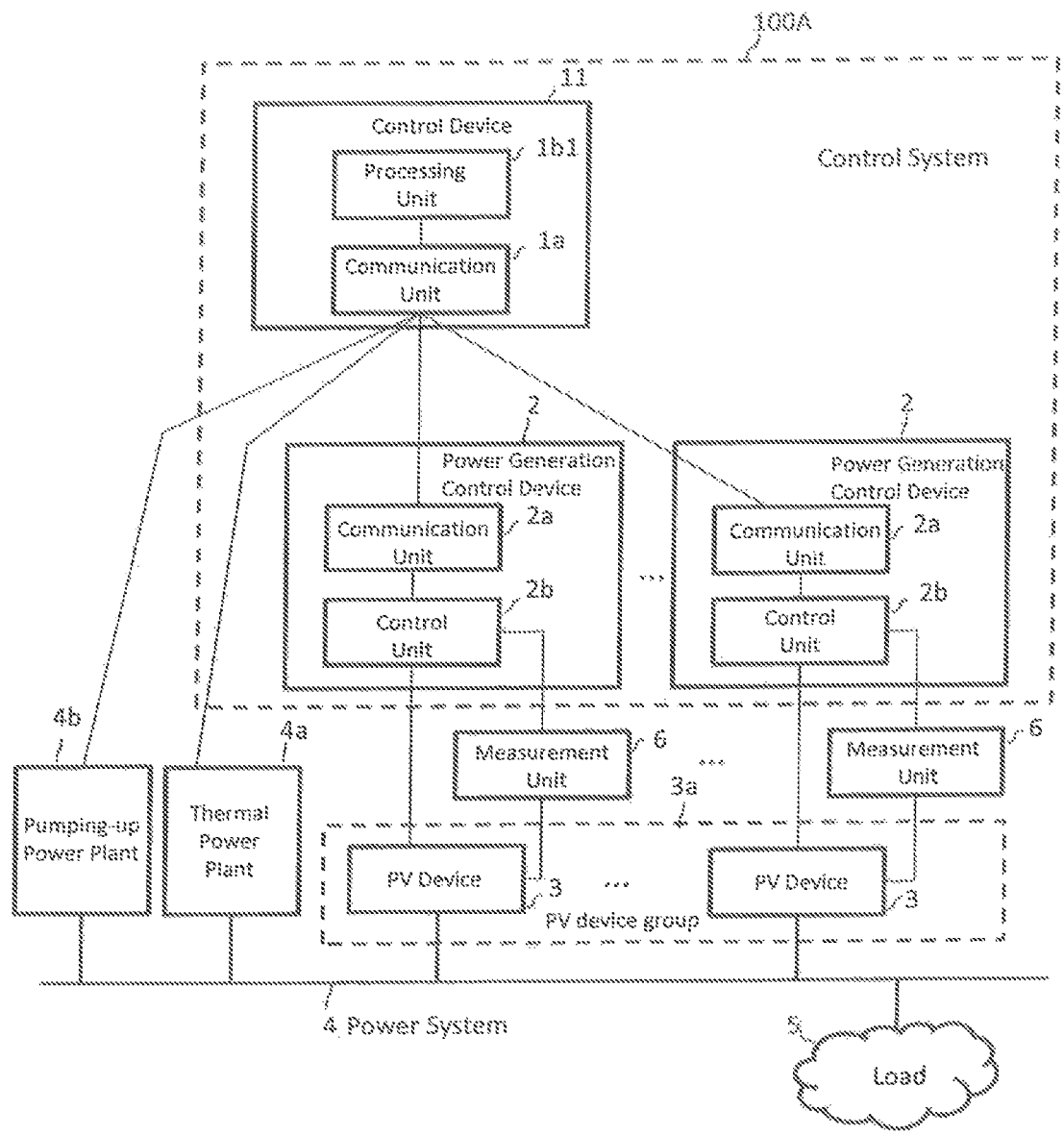
FIG. 10 shows control system 100A of the fifth exemplary embodiment.

FIG. 10 shows control system 100A of the fifth exemplary embodiment, in FIG. 10, constituent elements that are identical to elements shown in FIG. 5 are given the same reference numbers.

The chief points of difference between control system 100A of the fifth exemplary embodiment and control system 100 of the fourth exemplary embodiment is that control system 100A of the fifth exemplary embodiment uses control device 11 and processing unit 1b1 in place of control device 1 and processing unit 1b shown in FIG. 5.

The following explanation regarding control system 100A of the fifth exemplary embodiment focuses on points that differ from control system 100 of the fourth exemplary embodiment.

Control system 100A includes control device 11 and a plurality of power generation control devices 2.

Control device 11 includes processing unit 1b1 and communication unit 1a.

Processing unit 1b1 is an example of a determination unit.

Processing unit 1b1 determines the output limitation information of each PV device 3 for establishing balance between power supply and demand in power system 4.

Processing unit 1b1 receives the actual power generation amount (power generation performance amount) of each PV device 3 from communication unit 1a.

On the basis of the power generation performance amount of each PV device 3, processing unit 1b1 determines a first index that relates to the state of output limitation at PV device group 3a and a second index that relates to the state of output limitation at each PV device 3.

Processing unit 1b1 determines output limitation information on the basis of the first index and the second index of PV device 3 for each PV device 3.

The operation is next described.

Figure 11:
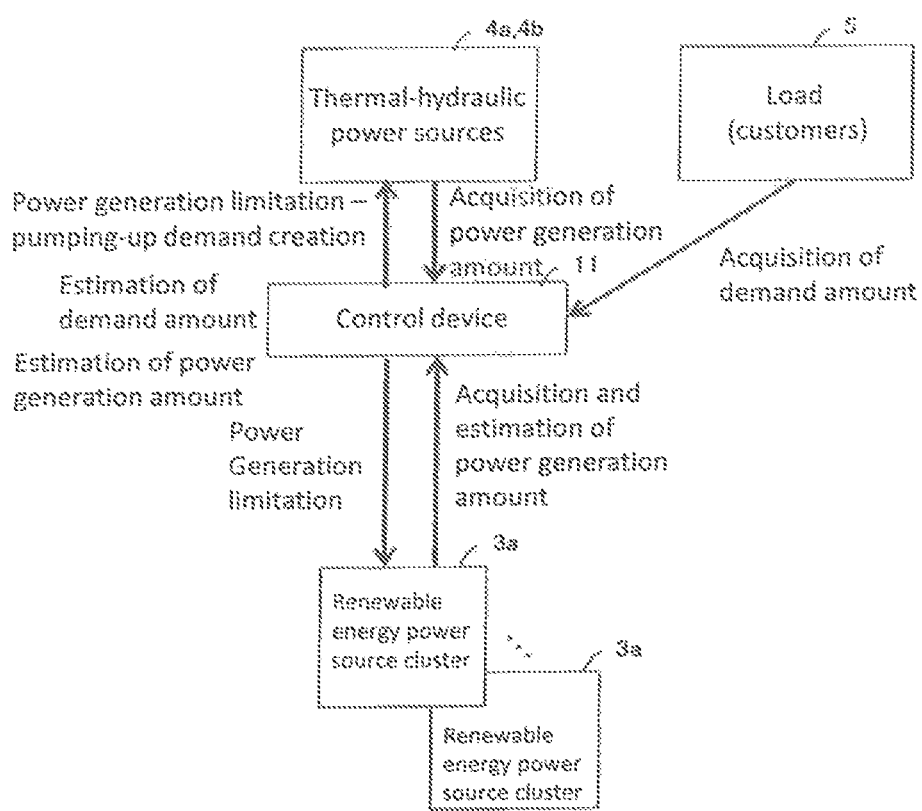
FIG. 11 is a view for describing the operation of control system 100A.

FIG. 11 is a view for describing the operation of control system 100A. In FIG. 11, a thermal power plant and pumping up power plant are represented together as a "thermal-hydraulic power source" and clusters of the PV devices are represented as "renewable energy power clusters".

Processing unit 1b1 of a power company first divides the plurality of PV devices 3 that are in the area of control of power system 4 that are under the jurisdiction of the power company into a plurality of clusters.

For example, processing unit 1b1 equally divides the area that is under the jurisdiction of the power company into L (for example, 100) areas such that each area (for example, a square having dimensions Y km×Y km) is separated with a distance of at least 10 km between centers. The size, shape, distance between centers, as well as the number L of the areas can be changed as appropriate.

Next in each area, processing unit 1b1 sorts the plurality of PV devices 3 in each area on the basis of the contract capacity of the PV devices 3.

In the present exemplary embodiment, processing unit 1b1 sorts PV devices 3 into the four categories of: C1: 500 kW or more; C2: from 50 kW or more to less than 500 kW; C3: from 10 kW or more to less than 50 kW; and less than 10 kW.

As a result, L×4 types of clusters can be realized. A sorting method that is based on the contract capacity is not limited to the four categories C1-C4 and can be altered as appropriate.

Processing unit 1b1 then assigns an order of $E_1$-$E_L$ to the L=100 equally divided areas. This order of areas may be set randomly or may be set such that geographically close areas are also close in order.

PV device groups (clusters) that belong to category C1 in each area are expressed as "$E_{1,C1}$".

As a remit, for example, cluster $E_{2,C1}$ is made up of a plurality of PV devices 3 that belong to area 2 and that nave a contract capacity of from 50 kW or more to less than 500 kW.

Processing unit 1b1 places categories C1-C4 in order of larger contract capacity, setting the order of priority in the order of C1-C4.

Figure 12:
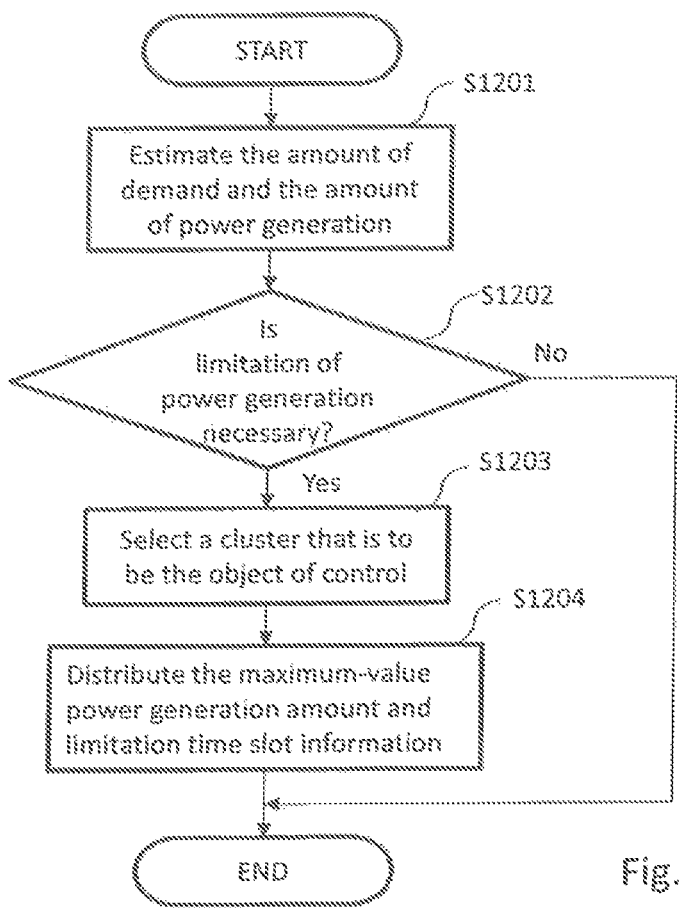
FIG. 12 is a flow chart for describing the operation of control device 11.

In the final selection of clusters, processing unit 1b1 selects in the order of $E_{1,C1}, E_{2,C1}, \ldots, E_{L,C1}, E_{1,C2} \ldots$ FIG. 12 is a flow chart for describing the operation of control device 11.

Processing unit 1b1 of the power company performs estimation from 0:00 to 24:00 in the coming week for the amount of demand of all customers (load 5) within the area of control of power system 4 that the power company controls and the power generation amounts of renewable energy power sources feat include all PV devices 3 (Step S1201). The estimation interval can be altered as appropriate.

As a result of this estimation, it is predicted that, even after creating demand by the pumping up of pumping-up power generation or limiting the output of thermal power generation in accordance with priority power supply stipulations, surplus power originating in PV devices will be generated at the time of 11:00 to 15:00 of day Y during one week.

As a result, processing unit 1b1 judges that output limitation is necessary in PV devices 3 (Step S1202). When the generation of surplus power originating in PV devices is not predicted, processing unit 1b1 judges that output limitation in PV devices 3 is not necessary (Step S1202).

When output limitation is necessary in PV devices 3, processing unit 1b1 determines to implement output limitation of PV devices 3.

The output limitation of PV devices 3 is implemented by the procedure shown below.

Processing unit 1b1 first reconfirms whether output limitation is necessary in PV devices 3 on the basis of the trends of power demand and power supply of that day of limitation.

An example of the reconfirmation method is next described.

On day Y, processing unit 1b1 monitors the trend of power demand based on the measured value (updated, for example, every 15 minutes) of the amount of power demand of all customers (load 5) and the predicted value. Here, the measured value of the amount of power demand of ail customers (load 5) is transmitted from the power meter (for example, a smart meter) of each customer to control device 11. The updating interval of the measured value of the amount of power demand of all customers (load 5) is not limited to 15 minutes and can be altered to, for example, 30 minutes as appropriate.

In addition, processing unit 1b1 monitors the trend of power supply for renewable energy power sources such as PV devices based on the measured value of the amount of generated power as well as the estimated value regarding power sources that lack measurement instruments.

Processing unit 1b1 judges whether surplus power originating in PV devices 3 is generated on the basis of the trends of power demand and power supply. This judgment corresponds to reconfirmation.

Processing unit 1b1, upon judging that surplus power originating in PV devices 3 will not occur, does not execute output limitation of PV devices 3. On the other hand, upon judging that surplus power originating in PV devices 3 will occur, processing unit 1b1 executes output limitation of PV devices 3.

The operation Is next described for a case in which, as a result of the reconfirmation, it is determined to execute output limitation of PV devices 3. As an example of this operation, a case is next described in which, at the time 10:00, it is judged that the potential is high for the generation of surplus power originating in PV devices 3 in the time slot of from 11:00 until 15:00. In this case, the time slot from 11:00 to 15:00 becomes the "output limitation time slot".

Processing unit 1b1 determines to implement power generation limitation of PV devices 3 from 11:00.

Processing unit 1b1 first selects the control-object cluster (Step S1203). In this case, processing unit 1b1 selects the cluster (control-object cluster) to be controlled first during the limitation time slot $Ttt_1$ (where $Ttt_1$=one hour) of 11:00-12:00.

At the time point of 10:30, processing unit 1b1 selects the minimum number of one or more clusters until the total estimated limitation amount value $\Sigma P_{m,total}$ [W] that can be subjected to power generation limitation in a cluster group made up of clusters that are selected in the order of priority reaches or surpasses the total limitation amount $Q_{total}$ [W] that is required in limitation time slot $Ttt_1$. It will be assumed that in this instance, clusters $E_{1,C1}$-$E_{40,C1}$ are selected as the control-object clusters.

In this cluster selection, the minimum number of clusters are selected such that $\Sigma P_{m,total} \geq Q_{total}$. As a result, processing unit 1b1 sets to 0 the maximum-value power generation amount of each PV device 3 in the control-object cluster (complete limitation).

The maximum-value power generation amount=0 of PV device 3 is an example of the output limitation information.

At 10:45, processing unit 1b1 next distributes the maximum-value power generation amount $W_1''=0$ and limitation time slot information $Itt_1$ that indicates the limitation time slot $Ttt_1$ to power generation control device (hereinbelow referred to as the control-object power generation control device) 2 that corresponds to each PV device 3n in the control-object cluster (Step S1204).

The timing of starting selection of the control-object clusters is not limited to 30 minutes before the limitation time slot. This timing should be a timing that is sufficiently earlier than the starting time of the limitation time slot by a time interval obtained by adding the time required for the selection of control-object clusters to the time required for distributing the maximum-value power generation amount and limitation time slot information.

In addition, the timing of distributing the maximum-value power generation amount and limitation time slot information is not limited to 15 minutes before the limitation time slot. This timing should be a timing that is sufficiently earlier than the starting time of the limitation time slot by time required for distributing the maximum-value power generation amount and the limitation time slot information.

In each object power generation control device 2, upon receiving maximum-value power generation amount $W_1''=0$ and limitation time slot information $Itt_1$ by way of communication unit 2a, control unit 2b holds maximum-value power generation amount $W_1''=0$ and limitation time slot information $Itt_1$.

Figure 13:
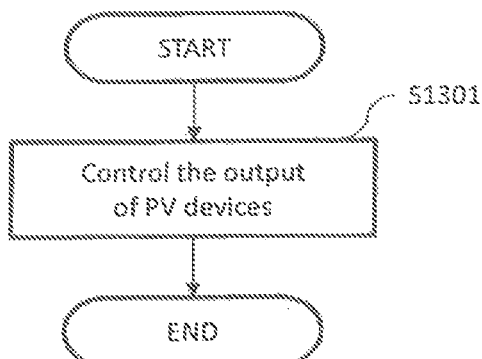
FIG. 13 is a flow chart for describing the operation of object power generation control device 2.

FIG. 13 is a flow chart for describing the operation of object power generation control device 2 that has received the maximum-value power generation amount $W_1''=0$ and the limitation time slot information.

At the starting time (in this case, 11:00) indicated by limitation time slot information $Itt_1$, control unit 2b controls the corresponding PV device 3 such that the output of corresponding PV device 3 becomes the maximum-value power generation amount $W_1''=0$ (Step S1301). For example, control unit 2b controls the PCS in corresponding PV device 3 to control corresponding PV device 3 such that the output of corresponding PV device 3 becomes maximum-value power generation amount $W_1''=0$.

Control unit 2b repeats Step S1301 at period $Tt_2$ (where $Tt_2$ is on the order of 1 second) until the end time indicated by limitation rime slot information $Itt_1$ (in this case, 12:00). Period $Tt_2$ is equal to or less than the time length of the limitation time slot (in this case, one hour). Further, period $Tt_2$ can be altered as appropriate to within a range that Is equal to or less than the time length of the limitation time slot.

On the other band, when the power generation limitation begins, processing unit 1b in control device 11 continuously collects power generation amount information that indicates the power generation performance amount of each PV device 3 from communication unit 2a of each power generation control device 2 at period Tt3 (where Tt3=approximately 15 minutes and $T3 \leq T1$).

Processing unit 1b1 next newly selects a control-object cluster at the time point 11:30. In the present exemplary embodiment, the minimum number of one or more clusters are selected until the total limitation estimated value $\Sigma P_{m,total}$ [W] that can be subjected to power generation limitation in the cluster group that is made up of clusters that are selected in the order of priority reaches or surpasses the value of total limitation amount $Q_{total}$ [W] that is required in limitation time slot $Ttt_2$. In this instance, clusters $E_{41,C1}$-$E_{67,C1}$ are assumed to be selected in addition to clusters $E_{1,C1}$-$E_{40,C1}$ as the control-object clusters.

In this cluster selection as well, the minimum number of clusters are selected such that $\Sigma P_{m,total} \geq Q_{total}$. As a result, processing unit 1b1 sets the maximum-value power generation amount of each PV device 3 in the control-object clusters to 0 (complete limitation).

Processing unit 1b1 then distributes maximum-value power generation amount $W_2''=0$ and limitation time slot information $Itt_2$ that indicates limitation time slot $Ttt_2$ to the power generation control device (object power generation control device) 2 that corresponds to each PV device 3n in the control-object cluster at 11:45.

Upon receiving maximum-value power generation amount $W_2''=0$ and limitation time slot information $Itt_2$ in each object power generation control device 2, control unit 2b holds the maximum-value power generation amount $W_2''=0$ and limitation time slot Information $Itt_2$.

At the starting time that is indicated by the limitation time slot information $Itt_2$ (in this case, 12:00), control unit 2b controls the PCS in corresponding PV device 3 to control corresponding PV device 3 such that the output of corresponding PV device 3 becomes the maximum-value power generation amount $W_1''=0$. Control unit 2b repeats this output control of PV device 3 at period Tt2 until the end time indicated by the limitation time slot information $Itt_2$ (in this case, 13:00).

This type of control-object cluster selection and output limitation control is subsequently repeated until 15:00.

By repeating this type of control-object cluster selection and output limitation control, the generation of surplus-power originating in PV devices 3 on day Y can be prevented.

Further, in the method of selecting limitation-object PV devices in the present exemplary embodiment, on the day of output limitation, PV devices 3 that have once been selected as objects of limitation have the potential to basically go on being selected according to the amount of the total required limitation amount $Q_{total}$ [W] until the limitation of that day ends. For example, when the $Q_{total}$ [W] of 12:00-13:00 is greater than the $Q_{total}$ [W] of 11:00-12:00, the $Q_{total}$ [W] of 13:00-14:00 is still greater, and the $Q_{total}$ [W] of 14:00-15:00 is less than the $Q_{total}$ [W] of 13:00-14:00 but greater than the of 11:00-12:00, selection is earned out such that a limitation-object PV device 3 that Is selected at 11:00-12:00 will continue to be selected as a limitation object for the duration of 11:00-15:00, the number of limitation-object PV devices 3 will be greatest at 13:00-14:00, and a portion of the limitation-object PV devices 3 will be eliminated as objects of limitation at 14:00-15:00.

In the next Instance of limitation (for example, on the day following day Y), processing unit 1b1 carries out selection in an order of priority that gives priority to PV devices 3 (cluster) that were not selected this time and then implements the above-described limitation.

After the implementation of several instances of the above-described limitation and at the stage in which all PV devices 3 belonging to all categories C1-C4 have been selected, processing unit 1b1 calculates the equitability state for each category, for example, for PV devices 3 belonging to category C1 (total number $N_{C1}$).

Processing unit 1b1 performs a calculation to determine as reference index A for PV device group 3a-C1 that is made up by PV devices 3 belonging to category C1:

$$\frac{\sum_{n_{C1}}\left\{\int_{T_{n_{C1}}}(M_{n_{C1}} - W_{T_{n_{C1}}}^{n_{C1}})dt\right\}}{N_{C1}}.$$

[Numerical Expression 16]

Reference index A shown in Numerical Expression 16 is the average value of the total power generation limitation amount that takes Into consideration the integrated limitation time of each PV device 3 of category C1. Reference index A is an example of the first index.

Here, $n_{C1}$ represents an individual PV device 3 that belongs to category C1. The total number of PV devices 3 that belong to category C1 is $N_{C1}$. $T_{n_{C1}}$ is the limitation implementation time of PV device $n_{C1}$. $M_{n_{C1}}$ is the contract capacity of PV device $n_{C1}$. $W_{T_{n_{C1}}}^{n_{C1}}$ is the maximum-value power generation amount in $T_{n_{C1}}$. In this instance, $W_{T_{n_{C1}}}^{n_{C1}}$ is 0.

In addition, processing unit 1b1 calculates and determines as Individual index $Bn_{C1}$:

$$\int_{T_{n_{C1}}}(M_{n_{C1}} - W_{T_{n_{C1}}}^{n_{C1}})dt.$$

[Numerical Expression 17]

Individual index $Bn_{C1}$ is an example of the second index.

Maximum-value power generation amount $W_{T_{n_{C1}}}^{n_{C1}}$ that is indicated in Numerical Expressions 16 and 17 is originally to be the total power generation amount of individual PV devices 3, and this portion should therefore be replaced by the actual power generation amount of individual PV devices 3. Because this is 0 in this instance, $W_{T_{m_{C1}}}^{n_{C1}}$ (=0) was set for the sake of simplification. In addition, contract capacity $M_{n_{C1}}$ may be substituted as the power generation estimation amount of each PV device 3.

In addition, the average value of the total power generation amount may be used in place of the average value of the total power generation limitation amount in Numerical Expressions 16 and 17.

Processing unit 1b1 then uses reference index A and individual index $B_{n_{C1}}$ when determining control-object PV devices 3 among PV devices 3 that belong to category C1.

In the present exemplary embodiment, processing unit 1b1 selects PV devices 3 in accordance with the size of the separation of the "positive" of individual index $Bn_{C1}$ of each PV device 3 of category C1 with respect to reference index A (the value of reference index A—individual index $Bn_{C1}$ when positive) and carries out limitation implementation, giving priority to PV devices 3 for which the separation is great at a subsequent instance of implementing limitation. At this time, processing unit 1b1 continuously implements limitation to make $W_{T_{n_{C1}}}^{n_{C1}}$ 0 for processing-object PV device 3. $W_{T_{n_{C1}}}^{n_{C1}}$ is here an example of output limitation information.

Processing unit 1b1 does not select PV devices 3 that correspond to individual index $Bn_{C1}$ as the objects of limitation when the size of the separation of the individual index $Bn_{C1}$ in each PV device of category C1 with respect to reference index A is 0 (reference index A=individual index $Bn_{C1}$ or when the size of the separation is a negative value (when reference index A—individual index $Bn_{C1}$ is a negative value).

Essentially, each PV device 3 is selected as an object of limitation until the size of the separation of individual index $Bn_{C1}$ is less than zero.

It will be assumed that in this instance, the time slot in which limitation is required is 10:00-15:00.

Processing unit 1b1 gives a new order of priority based on foe above-described amount of separation for each area for PV devices 3 belonging to category C1.

Processing unit 1b1 selects PV devices 3 according to this new order of priority for each area in the order of the area number.

At this time as well, in the interest of simplifying control, on this day, PV devices 3 that have once been selected as objects of control continue to be selected until limitation of this day ends such that the necessary amount of limitation is satisfied.

Processing unit 1b1 uses reference index A and individual index B to set a new order of priority for the other categories (C2-C4) as carried out in category C1 and determines PV devices 3 that are to be objects of limitation in accordance with the new order of priority.

The effect of the present exemplary embodiment is next described.

In the present exemplary embodiment, through the above-described use of equitability indices (reference index A and individual index B) to carry out selection of PV devices 3 that are the objects of output limitation, power generation limitation can be implemented that, to the extent of increase of the number of instances of execution of limitation, guarantees equitability among PV devices 3 that belong to the same category (C1-C4).

A modification of the present exemplary embodiment is next described.

In the present exemplary embodiment, control is carried out in which the possibility exists that PV devices 3 that have once been selected as objects of limitation will continue to be selected until limitation of that day ends in the units of days in which limitation is implemented. Control may here be carried out in which the interval in which the same PV device 3 continues to be selected is not in day units, but rather, in units that can change to finer granularity such as units of hours. In such cases, a process that was carried out for each day in the above-described exemplary embodiment may be carried out for each predetermined time interval. In such cases, control may become more complex, but limitation can be implemented that satisfies equitability in a shorter interval.

Further, in the present exemplary embodiment, processing unit 1b1, after having selected all PV devices 3 that belong to the same category within, for example, the same area, selects all PV devices 3 that belong to the same category in the next area.

However, after having selected a predetermined portion of PV devices 3 that belong to the same category within the same area, processing unit 1b may also transition to the selection of PV devices 3 that belong to the same category of the next area.

For example, processing unit 1b1 may carry out control by giving numbers within an area to PV devices 3 that belong to the same category (for example, C1), then selecting a number of just 30% of the entirety in the order of these numbers, and then transitioning to the selection of PV devices 3 of the same category in the next area.

For example, although only up to clusters $E_{1,C1}$-$E_{40,C1}$ were selected in limitation time slot $Ttt_1$ in the above-described exemplary embodiment, clusters $E_{1,C1}$-$E_{100,C1}$ are selected in this case. As a result, the geographical dispersion of limitation-object PV devices 3 increases in the implementation of limitation (taking into consideration the leveling effect of photovoltaic power generation in the present exemplary embodiment, area demarcation is carried out such that the distance between centers of each area is at least 10 km), limitation can be implemented in a form that promotes the leveling effect of photovoltaic power generation and that is effective for Improving the stability of the power system.

Processing unit 1b1 may select clusters in the order of priority until the estimated value of the total power generation limitation amount $\Sigma P_{m,total}$ [W] (when the power generation of each PV device 3 is set to 0 in the time slot of that day, the amount of power generation that can be expected to be limited front estimated value of the total power generation amount) of the cluster group becomes J (where J is an integer equal to or greater than 2) times the value of $Q_{total}$ [W] that is equal or greater than the value of the required total amount of limitation $Q_{total}$ [W].

In this ease, processing unit 1b1 implements power generation limitation of PV devices 3 in the limitation-object cluster group, for example, as shown below.

Processing unit 1b1 first subtracts the required total limitation amount $Q_{total}$ from the estimated value of total power generation limitation amount $\Sigma P_{m\_total}$ [W] of the limitation-object cluster group to derive the total amount of permitted power generation $P'_{m\_total}$ of the cluster group.

Processing unit 1b1 next derives the ratio (=$P'_{m\_total}$/$P_{T\_total}$) of the total amount of permitted power generation $P'_{m\_total}$ in the limitation-object cluster group and the total contract capacity $P_{T\_total}$ of PV devices 3 in the limitation-object cluster group.

Processing unit 1b1 then derives a value obtained by multiplying the ratio (=$P'_{m\_total}$/$P_{T\_total}$) by the contract capacity $M_n$ of PV devices 3 in the limitation-object cluster group as the maximum-value power generation amount $W^n$ of PV devices 3 in the limitation-object cluster group.

Processing unit 1b1 next uses the maximum-value power generation amount $W^n$ of PV devices 3 in the limitation-object cluster group to implement power generation limitation of PV devices 3 in the limitation-object cluster group (in this case, the maximum value is not 0, the power generation of several tens of percent of the contract capacity being permitted).

Further, when storage cells are installed together with PV devices 3, or when storage cells and PV devices 3 are installed at physically remote locations but the two are paired and viewed as storage cells that are virtually installed together with PV devices 3, control unit 2b in power generation control device 2 may, when receiving maximum-value power generation amount $W^n$, use the portion of the power generation amount of corresponding PV devices 3 that exceeds the maximum-value power generation amount to charge storage cells instead of limiting the power generation of corresponding PV devices 3. In this case as well, output to power system 4 from PV devices 3 can be limited. In addition, in pairing storage cells with PV devices 3, pairing can be considered that allows freedom in combining, such as the combination of a plurality of storage cells and a plurality of PV devices, the combination of a single storage cell and a plurality of PV devices, and the combination of a plurality of storage cells and a single PV device 3.

The implementation of a plurality of instances of this type of limitation enables accurate control of equitability of output limitation among PV devices 3 belonging to the same category.

The external device of the first exemplary embodiment and the control devices of the second to fifth exemplary embodiments are not necessarily managed by a power company and may also be managed by, for example, a PPS, IPP, or aggregator.

Sixth Exemplary Embodiment

In the sixth exemplary embodiment of the present invention, the output limitation of a PV device is carried out under circumstances in which the manager of a PV device obtains profit by supplying the output of a PV device to a power system and in which the equitability of loss that occurs from output limitation of the PV device is taken into consideration.

In the sixth exemplary embodiment, similar to the fourth exemplary embodiment, PV devices are an example of the power generation devices and renewable energy power sources. The power generation devices are not limited to PV devices and can be altered as appropriate. For example, WT devices may also be used as the power generation devices.

In addition, a portion of a plurality of PV devices that belong to the same cluster may be altered to power generation devices other than PV devices (such as WT devices).

Figure 14:
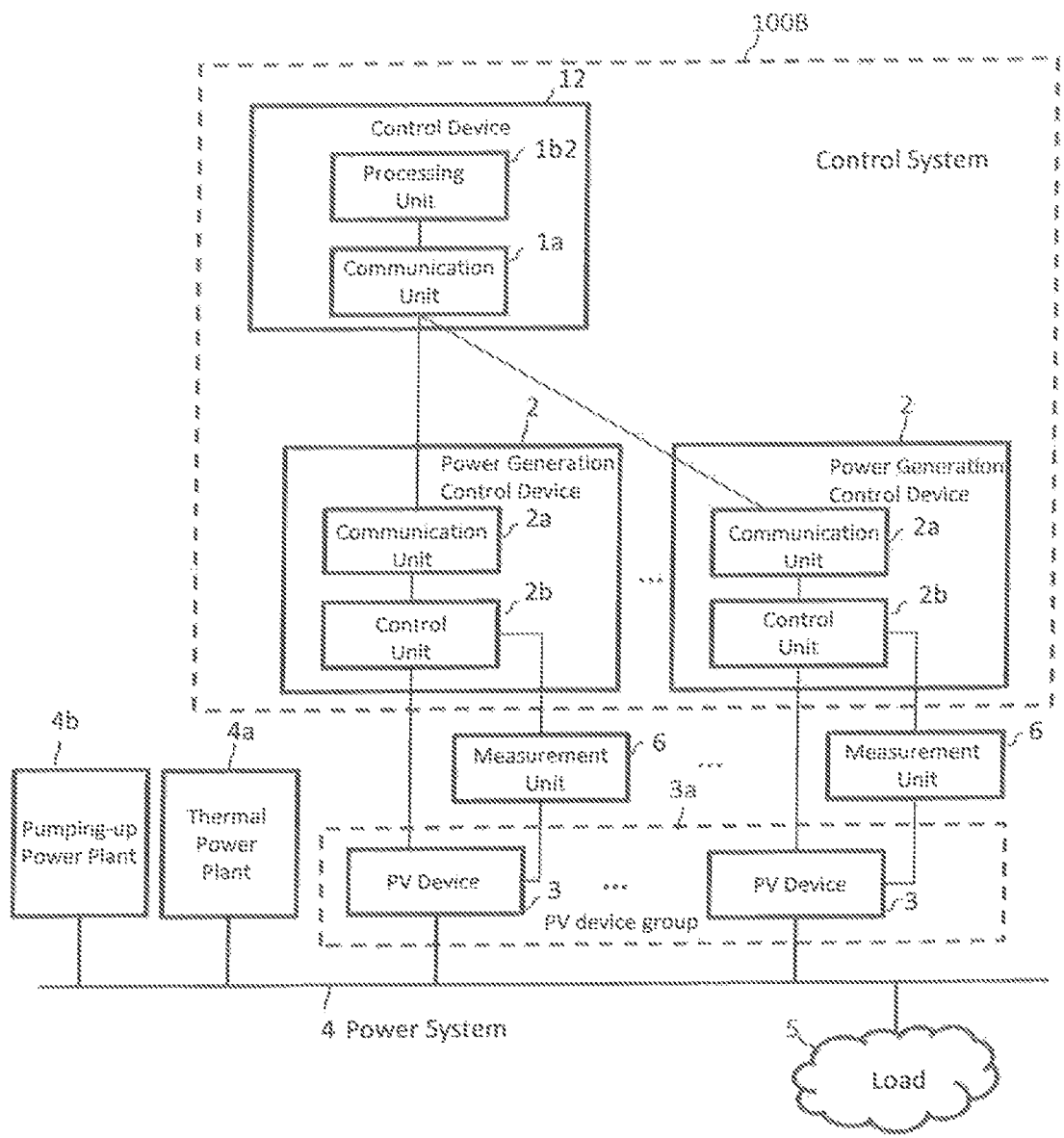
FIG. 14 shows control system 100B of the sixth exemplary embodiment.

FIG. 14 shows control system 100B of the sixth exemplary embodiment. In FIG. 14, constituent elements that are Identical to elements shown in FIG. 5 are given the same reference numbers.

The chief points of difference between control system 100B of the sixth exemplary embodiment and control system 100 of the fourth exemplary embodiment is that control device 12 and processing unit 162 are used in place of control device 1 and processing unit 1b shown in FIG. 5.

In the following explanation, control system 100B of the sixth exemplary embodiment is described with focus upon the points of difference with control system 100 of the fourth exemplary embodiment.

Control system 100B includes control device 12 and a plurality of power generation control devices 2.

Control device 12 is managed by an aggregator.

Control device 12 includes processing unit 1b2 and communication unit 1a.

Processing unit 1b2 is an example of the determination unit.

Processing unit 1b2 determines the output limitation information of each PV device 3 for establishing balance between electric power supply and demand in power system 4.

Processing unit 1b2 receives and acquires the actual power generation amount (power generation performance amount) of each PV device 3 from communication unit 1a.

On the basis of the power generation performance amount of each PV device 3, processing unit 1b2 determines a first index that relates to the output limitation state at PV device group 3a and a second index that relates to the output limitation state at each PV device 3.

Processing unit 1b2 determines the output limitation information on the basis of the first index and the second index of PV devices 3 for each PV device 3.

The operation is next described.

Figure 15:
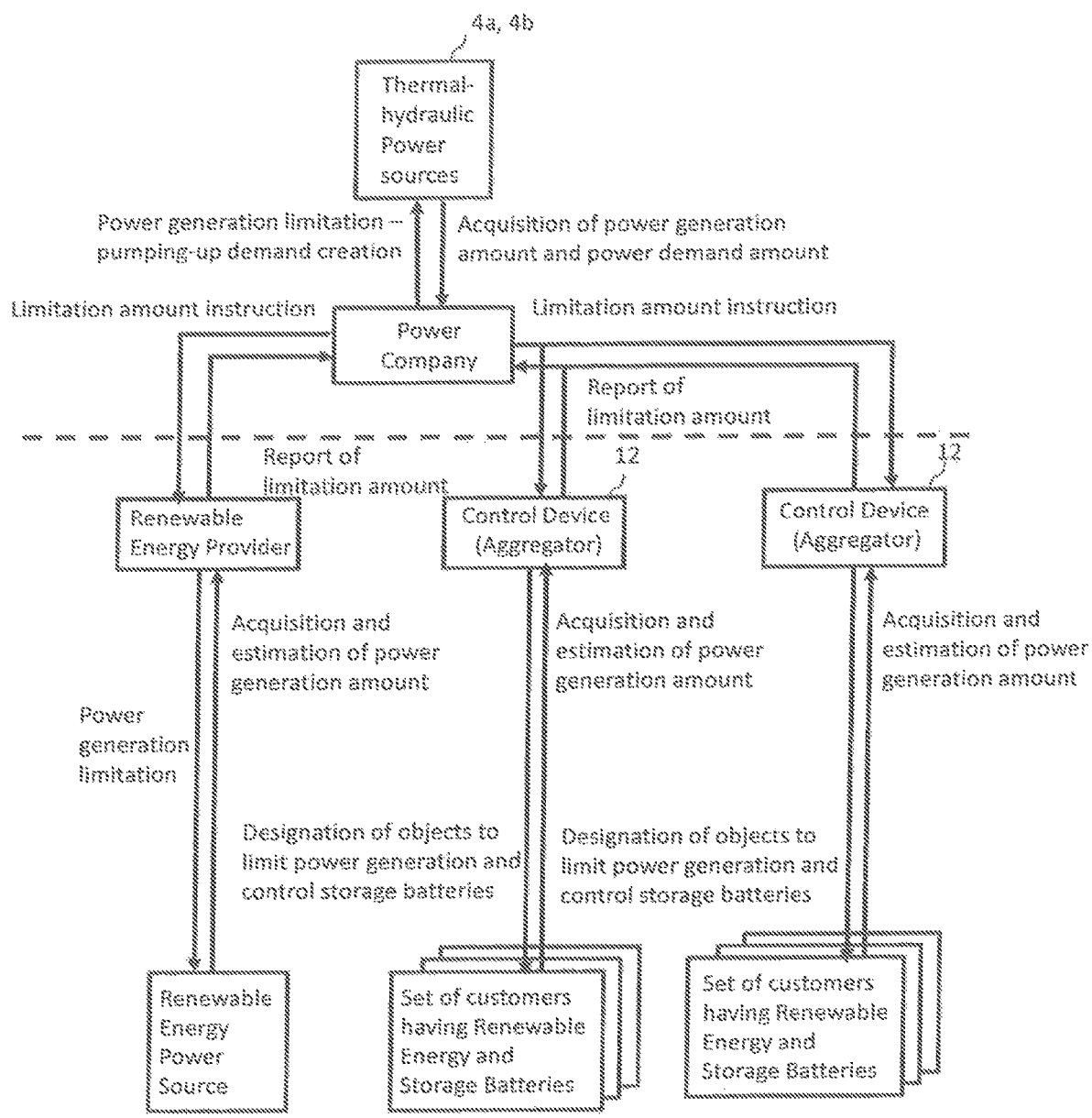
FIG. 15 is a view for describing the operation of control system 100B.

FIG. 15 is a view for describing the operation of control system 100B. In FIG. 15, a thermal power plant and pumping-up power plant are represented together as a "thermal-hydraulic power source."

The operation at the starting time of limitation by control system 100B is first described.

At, for example, 9:00 of the preceding day, a power company makes predictions of the amount of demand of all customers (load 5) in the area of control of power system 4 that Is under the jurisdiction of the power company and the power generation amount of renewable energy power sources that include all PV devices 3 for the time slot from 0:00 until 24:00 of the next day. The time at which the prediction is made is not limited to 9:00 and can be altered as appropriate.

It is assumed that, as a result of the prediction, the generation of surplus power originating in PV devices after 10:00 is predicted even after, for example, creating demand by the pumping up of pumping-up of power generation (pumping operation) or limiting the output of thermal power generation in conformance with preferred power supply stipulations.

As a result, the power company determines implementing a portion of the necessary power generation limitation upon PV devices 3 that are managed/controlled by the aggregator. Here, a plurality of aggregators can be considered, but because limitation can be implemented by the same method for any of the aggregators, detailed description regarding the implementation of limitation by aggregator by aggregator will be omitted.

At 9:00 of the day of limitation, processing unit 1b2 that is managed by an aggregator receives a request from the power company to limit power generation to 50% or less of the contract capacity with PV devices 3 that are managed/controlled by the aggregator as the objects in the time slot from 10:00 to 15:00.

Due to the report that the limitation time slot is from 10:00 to 15:00, processing unit 1b2 divides this five-hour time slot into one-hour intervals and takes each divided time slot as $Tt_j$. In this instance, the divided time slots starting from 10:00 are $Tt_0$, $Tt_1$, $Tt_2$, $Tt_3$, and $Tt_4$. The length of the divided time slots is not limited to one hour and can be altered as appropriate.

In this instance, power generation limitation is Implemented that limits the amount of power generation of PV device group 3a to 50% or less of the contract capacity in divided time slot $Tt_0$.

Fifteen minutes before 10:00 (9:45), processing unit 1b2 distributes, from communication unit 1a to each power generation control device 2, planned individual index $P'_{0,n}=0.5$ and divided time slot information $I_0$ that indicates divided time slot $Tt_0$.

The timing for determining that planned individual index $P'_{0,n}=0.5$ is not limited to fifteen minutes before the starting time of divided time slot $Tt_0$. This timing can be altered as appropriate on the condition that the timing for transmitting planned Individual index $P'_{0,n}=0.5$ and divided time slot information $I_0$ come before the starting time of divided time slot $Tt_0$.

In each power generation control device 2, upon receiving planned individual index $P'_{0,n}=0.5$ and divided time slot information $I_0$ by way of communication unit 2a, control unit 2b holds planned individual index $P'_{0,n}=0.5$ and divided time slot information $I_0$.

At the starting time that is indicated in divided time slot information $I_0$ (in this case, 10:00), control unit 2b controls the PCS in corresponding PV devices 3 at period T2 such that die maximum-value power generation amount of corresponding PV devices 3 becomes a power generation amount obtained by multiplying planned individual index $P'_{0,n}=0.5$ by the contract capacity [W]. Control unit 2b executes this control until the end time (in this case, 11:00) indicated by divided time slot information $I_0$.

The potential exists for the occurrence of variation among the outputs of PV devices 3 due to weather conditions even though each PV device 3 is subjected to output limitation at common planned individual index $P'_{0,n}=0.5$. This variation affects the performance of output limitation.

On the other hand, in control device 12, processing unit 1b2 continuously collects, from communication unit 2a of each power generation control device 2, power generation amount information that indicates the power generation performance amount of each PV device 3 at period Ts3 (where Ts3 is on the order of 5 minutes, and T2<Ts3<time length of divided time slot).

In the present exemplary embodiment, processing unit 1b2 controls the output of each PV device 3 to guarantee equitability of the power sales profit obtained in each PV device 3.

Processing unit 1b2 here holds in advance unit power sale price Zn of each PV device 3. Processing unit 1b2 calculates:

$$P_1 := \frac{\sum_{n=1}^{N} Z_n \int_{T_0} PV^n(t)dt}{\sum_{n=1}^{N} Z_n M_n |T_0|} \qquad \text{[Numerical Expression 18]}$$

to determine the reference index. The reference index is an example of the first index.

In addition, processing unit 1b2 calculates:

$$P_{1,n} := \frac{Z_n \int_{T_1} PV^n(t)dt}{Z_n M_n |T_1|} \qquad \text{[Numerical Expression 19]}$$

to determine the performance individual index. The performance Individual index is an example of the second Index.

Processing unit 1b2 further calculates:

$$Q_{1,n} := \frac{Z_n W_1^n |T_1|}{Z_n M_n |T_1|} = \frac{W_1^n Z_n}{M_n Z_n}. \qquad \text{[Numerical Expression 20]}$$

Processing unit 1b2, when subsequently calculating planned individual index $P'_{1,n}$ of each divided time slot, while successively applying feedback, takes as maximum-value power generation amount $W_j^n$ of each PV device 3 in divided time slot $Tt_j$, the values $W_j^1, \ldots, W_j^n$ obtained by solving the following two equations:

$$\min_{W_j^1,\ldots,W_j^n} \sum_{n=1}^{N} \left\{ Q_{J,n} - P_J + \sum_{j=1}^{J} (P_{j-1,n} - P_j) \right\}^2 \quad \text{[Numerical Expression 21]}$$

$$\sum_{n=1}^{N} W_j^n \leq G_J. \quad \text{[Numerical Expression 22]}$$

In each divided time slot $Tt_j$ processing unit 1b2 distributes, from communication unit 1a to corresponding power generation control device 2, planned individual index $P'_{j,n}$ that is a value obtained by dividing maximum-value power generation mount $W_j^n$ by the contract capacity $M_n$ and divided time slot information $I_j$ that indicates divided time slot $Tt_j$ at each divided time slot $Tt_j$. The planned individual index is an example of output limitation information.

The operation of each power generation control device 2 is similar to the operation of the third exemplary embodiment and is therefore here omitted.

The effect of the present exemplary embodiment is next described.

Equitable limitation can be implemented in proportion to the increase of the number of repetitions of the above-described feedback control on the basis of an economy index among PV devices 3.

A modification of the present exemplary embodiment is next described.

An average value of the electricity sale profit/loss that accords with the amount of power limitation in an elapsed time slot of the output limitation time slots of each power generation device that belongs to a power generation device group may be used as a reference index, and electricity sales profit/loss that accords with the amount of power limitation in the elapsed time slot of the PV device may be used as the planned individual index.

In the fourth to sixth exemplary embodiments, the period (hereinbelow referred to as "$T_{10}$") of transmitting output limitation information (the planned individual index and maximum-value power generation amount) from a control device relating to the limitation time slot may be determined as shown below.

When there is a time interval T in which a particular continued limitation control is necessary, in order to implement feedback for guaranteeing limitation control equitability as many times M as possible, the limitation control time interval is divided as in T/M and $T_{10}$=T/M is taken as relevant period $T_{10}$, and as period $T_{10}$, the limitation control time Interval is divided and limitation control is implemented using a different equitability index for each period $T_{10}$.

On one hand, period $T_{10}$ must be a period that is equal to or greater than the necessary time interval for carrying oat an optimization calculation process (on the order of more than 15 minutes); but on the other hand, for a period of replanning the activation/halting of the power generator, an equal period or, when changes in the weather are extreme (due to the difficulty of guaranteeing equitability), a shorter period (on the order of less than one hour) is preferable. However, period $T_{10}$ may also be in one-day units. Although this case puts a burden upon the power system side from the standpoint of stability and causes adverse effects such as the deterioration of the efficiency of power generation of renewable energy power sources, it has the advantage of simplifying control.

A summary is here presented of examples of the combination of the first index and second index. In the following explanation, "renewable energy power source n" is used as a construction that corresponds to PV device $3n$.

Here, "renewable energy power sources" that are the object of index calculation pertain to "renewable energy power sources" for which equitability must be considered, but even when the expression "all renewable energy power sources" is used, attention must be paid to the point that renewable energy power sources for which equitability need not be considered are excluded (for example, in certain cases, renewable energy power sources refers only to photovoltaic power generation of 500 kW or more for which the implementation of power generation limitation is expected while renewable energy power sources of less than 500 kW need not be subjected to limitation in the first place and are therefore not considered in index calculation).

In addition, $\Sigma$ is integration for n up to a total number N. Further, although the expressions "rated value" and "contract capacity" are used hereinbelow, these terms are used in the following explanation because, in a renewable energy power source such as in photovoltaic power generation, the contract capacity of a photovoltaic panel may be greater than or less than the rated value of a PCS, and the use of the contract capacity will therefore be in some cases preferable to the rated value of the PCS.

Combination Example 1

Total limitation time that limitation of a renewable energy power source is implemented (average value).

First index=$X/Y$, where:

$X=\Sigma$ (integrated value $\int t_n[X_n]$) of the limitation time that limitation of the renewable energy power source n is implemented) [h]; and Y=total number of renewable energy power sources n=N.

Second index=$X_n$, where:

$X_n$=Integrated value $\int t_n$ of the limitation time that limitation of renewable energy power source n was implemented [h].

Combination Example 1 is applied in, for example, the first to fourth exemplary embodiments.

Combination Example 2

The ratio of the amount of power generated in limitation time T with respect to the power generation amount at the rated power or the contract capacity for limitation time T.

First index=$X/Y$, where:

X=total power generation amount [Wh] after limitation of all renewable energy power sources in limitation time T;

=$\Sigma$ (power generation amount "Xn" after limitation in limitation time T following limitation of renewable energy power source n) [Wh];

Y=(Sum total of rated value or contract capacity of renewable energy power source n)×limitation time T [Wh]; and =Σ (rated value or contract capacity of renewable energy power source n)×limitation time T [Wh].

Second index=$X_n/Y_n$, where:

$X_n$=power generation amount [Wh] of renewable energy power source n after limitation in limitation time T of renewable energy power source n; and $Y_n$=(rated value or contract capacity of renewable energy power source n)×limitation time T [Wh].

Note: Limitation time T may also be set to Integrated limitation time ∫t (=integrated value of elapsed limitation time).

This index is used when comparing among renewable energy power sources whose (integrated) limitation time, in which limitation was implemented, is equal (This means that ∫$t_n$ for renewable energy power scarce n is equal regarding the integrated limitation time regardless of n. In the following explanation, this case is also expressed ∫$t_0$=∫t.

Combination example 2 is applied in, for example, the first to fourth exemplary embodiments.

Combination Example 3

The ratio of the power amount that is generated in integrated limitation time ∫t with respect to the generated power amount at the rating or the generated power amount at the contract capacity for each unit time.

First index=$X/Y$, where:

X=total power generation amount [Wh] after limitation of all renewable energy power sources in integrated limitation time ∫t;

=Σ (total power generation amount $X_n$ after limitation of renewable energy power source n in integrated limitation time ∫$t_n$; and Y=Σ (rated value or contract capacity of renewable energy power source n)×(one hour) [Wh].

Second index=$X_n/Y_n$, where:

$X_n$=total power generation amount [Wh] after limitation of renewable energy power source n in integrated limitation time ∫$t_n$; and $Y_n$=(rated value or contract capacity of renewable energy power source n)×(one hour) [Wh].

Note: Integrated limitation time ∫t may also be substituted by limitation time T.

This index is used when comparing among renewable energy power sources whose (integrated) limitation time, in which limitation was implemented, is equal.

Combination Example 3 is applied in, for example, the first to fourth exemplary embodiments.

Combination Example 4

The ratio of the power amount, that was subjected to power generation limitation in limitation time T with respect to the power generation amount at the rated power or the contract capacity for limitation time T.

First index=$(Y-X)/Y$, where:

X=Σ (power generation amount "$X_n$" after limitation in limitation time T of renewable energy power source n) [Wh]; and Y=Σ (rated value or contract capacity of renewable energy power source n)×limitation time T [Wh].

Second index=$(Y_n-X_n)/Y_n$, where:

$X_n$=Power generation amount [Wh] after limitation in limitation time T of renewable energy power source n; and $Y_n$=(Rated value or contract capacity of renewable energy power source n)×limitation time T [Wh].

Note: Limitation time T may also be substituted by integrated limitation time ∫t.

This index is used when comparing among power sources whose (integrated) limitation time, in which limitation was implemented, is equal.

Combination Example 4 is applied in, for example, the first to fourth exemplary embodiments.

Combination Example 5

A ratio per unit time of the power amount that was subjected to power generation limitation in integrated limitation time with respect to the generated power amount at the rated generated power amount or the contract capacity.

First index=$(Y1-X)/Y$, where:

X=Σ (total power generation amount $X_n$ after limitation of renewable energy power source n in integrated limitation time ∫$t_n$) [Wh];

Y1=Σ (the rated value or the contract capacity of renewable energy power source n×∫$t_n$) [Wh]; and Y=Σ (the rated value or the contract capacity of renewable energy power source n)×(one hour) [Wh].

Second index=$(Y_{n1}-X_n)/Y_n$, where:

$X_n$=The total power generation amount after limitation of renewable energy power source n in integrated limitation time ∫$t_n$ [Wh];

$Y_{n1}$=the rated value or contract capacity of renewable energy power source n×∫$t_n$ [Wh]; and $Y_n$=(the rated value or contract capacity of renewable energy power source n)×(one hour) [Wh].

Note: integrated limitation time ∫t may also be substituted by limitation time T.

This index is used when comparing among renewable energy power source whose (integrated) limitation time, in which limitation was implemented, is equal.

Combination Example 5 is applied to, for example, the first to fourth exemplary embodiments.

Combination Example 6

The amount of generated power of a renewable energy power source in limitation time T.

First Index=$X/Y$, where:

X=the total power generation amount [Wh] after limitation of all renewable energy power sources in limitation time T;

=Σ (the power generation amount after limitation in limitation time T of renewable energy power source n) [Wh]; and Y=the total number of renewable energy power sources n=N.

Second index=$X_n$

=power generation amount [Wh] after limitation in limitation time T of renewable energy power source n.

Note: The integrated limitation time $ft$ (=integrated value of elapsed limitation time) may be used as the limitation time.

This Index is used when comparing among renewable energy power sources whose (integrated) limitation time, in which limitation is implemented, is equal.

Combination Example 6 is applied in, for example, the first to fourth exemplary embodiments.

Combination Example 7

The amount of power of a renewable energy power source that is subjected to power generation limitation in integrated limitation time $ft$.

First index=$(Y1-X)/Y$, where:

$X=\Sigma$ (total power generation amount $X_n$ after limitation of renewable energy power source n in integrated limitation time $ft_n$) [Wh];

$Y1=\Sigma$ (rated value or contract capacity of renewable energy power source n×$ft_n$) [Wh]; and Y=Total number of renewable energy power sources n=N.

Second index=$(Y_{nj}-X_n)$, where:

$X_n$=total power generation amount [Wh] after limitation of renewable energy power source n in integrated limitation time $ft_n$; and $Y_{n1}$=rated value or contract capacity of renewable energy power source n×$ft_n$ [Wh].

Note: Limitation time T may be used as integrated limitation time $ft$.

This index is used when comparing renewable energy power sources whose (integrated) limitation time, in which limitation is implemented, is equal.

Combination Example 7 is applied in, for example, the first to fourth exemplary embodiments.

Combination Example 8

When considering a equitability index, the electricity sales profit/loss, which is an economy index, can be considered rather than the generated power amount, which is a physical index. In this case, information of the unit electricity sales price $Z_n$ [yen/kWh] is used (sixth exemplary embodiment) that changes according to, for example, the contract year of a FIT (Feed-in Tariff: a fixed-price purchase system).

The ratio of the electricity sales profit that is actually obtained in electricity sales in limitation time T with respect to the electricity sales profit that is expected to be obtained if power is generated at the rated power or contract capacity in limitation time T.

First index=$P/Q$, where:

P=the total electricity sales profit [yen] after limitation of all renewable energy power sources in limitation time T =$\Sigma$ (power generation amount after limitation in limitation time T after limitation of renewable energy power source n×"$Z_n$") [yen]; and Q=the total electricity sales profit [yen] when none of the renewable energy power sources are subjected to limitation in limitation time T =$\Sigma$ (the rated value or contract capacity of renewable energy power source n)×(limitation time T×$Z_n$) [yen].

Second index=$P_n/Q_n$, where:

$P_n$=the electricity sales profit after limitation of renewable energy power source n in limitation time T [yen]

=the power generation amount "$X_n$" after limitation in limitation time T after limitation of renewable energy power source n×"$Z_n$" [yen]; and $Q_n$=the electricity sales profit when renewable energy power source n is not subjected to limitation in limitation time T [yen]

=(the rated value or contract capacity of renewable energy power source n)×(limitation time T×$Z_n$) [yen].

Note: Limitation time T can also be used as integrated limitation time $ft$.

This index is necessary when comparing among power sources for whose (integrated) limitation time is equal.

Note 2: In the case of a renewable energy power source such as in photovoltaic power generation, the contract capacity of a photovoltaic panel, is in some cases greater than the rated value of a PCS and in some cases smaller, and the use of the contract capacity is therefore at times preferable to the rated value of the PCS.

Combination Example 8 is applied in, for example, the sixth exemplary embodiment.

The clustering of renewable energy power sources according to contract capacities (such as 10 kW, 50 kW, 500 kW, etc.) and the use of the absolute value of the power generation limitation time (Combination Example 9), the absolute value of the amount of power generation (limitation) (Combination Example 10), or the absolute value of the electricity sales (profit) loss (Combination Example 11) as a equitability index for each contract capacity cluster can also be considered.

Combination Example 9

Renewable energy power sources that have the same contract capacity, and that belong to the same cluster (including clusters classified by area or by renewable energy category), or that belong to the same cluster, and moreover, have the same contract capacity are taken as the objects in establishing equitability, and the method of Combination Example 1 is used.

Combination Example 9 is applied in, for example, the fifth exemplary embodiment.

Combination Example 10

Renewable energy power sources that have the same contract capacity, and that belong to the same cluster (including clusters classified by area or by renewable energy category), or that belong to the same cluster, and moreover, that have the same contract capacity are taken as the objects in establishing equitability, and the method of Combination Example 6 or 7 is used. Combination Example 10 is applied in, for example, the fifth exemplary embodiment.

Combination Example 11

Renewable energy power sources that have the same contract capacity, and that belong to the same cluster (including clusters classified by area or by the renewable energy category), or that belong to the same cluster, and moreover, that have the same contract capacity are taken as the objects in establishing equitability.

The electricity sales profit or the electricity sales loss itself in limitation time T.

First index=the average value of the electricity profit (loss) of each renewable energy power source having the same contract capacity in limitation time T [yen].

Second index=the electricity sales profit $P_n$ after limitation of renewable energy power source n of the same contract capacity in limitation time T =power generation amount "$X_n$" after limitation of the renewable energy power source n×"$Z_n$" [yen]

or

=the electricity sales loss $R_n$ after limitation of the renewable energy power source n =(the contract capacity of the renewable energy power source×"$Z_n$"=$Q_n$)–"$P_n$" [yen].

Note: Limitation time T may also be taken as the integrated limitation time ∫t.

This index must be used in a comparison among power sources whose (integrated) limitation time is equal.

Combination Example 11 is applied in, for example, the fifth exemplary embodiment In the above-described Combination Examples 1-11, an index can be considered in which the portion of "power generation amount at the rating or the amount of generated power at die contract capacity" is substituted by "estimated amount of power that can be generated".

Combination Example 12

The ratio of the amount of power that was generated in limitation time T with respect to the estimated amount of power that can be generated in limitation time T.

First index=$X/Y$, where:

X=the total amount of generated power after limitation of all renewable energy power sources in limitation time T [Wh]

=Σ (power generation amount $X_n$ in limitation time T after limitation of renewable energy power source n) [Wh]; and Y=the total estimated amount of power that can be generated in all renewable energy power sources in limitation time T [Wh]

=Σ (estimated amount of power that can be generated in limitation time T of renewable energy power source n) [Wh].

Second index=$X_n/Y_n$, where:

$X_n$=power generation amount after limitation of renewable energy power source n in limitation time T [Wh]; and $Y_n$=estimated amount of power that can be generated in limitation time T of renewable energy power source n [Wh].

Note: Limitation time T may also be taken as integrated limitation time ∫t.

Combination Example 13

An index for realizing equitability among clusters in a state in which there are a plurality M of clusters m that are made up of renewable energy power source groups (as an example, the formation of clusters classified by prefecture can be considered).

First index=$X/Y$, where:

X=Σ (power generation amount $X_m$ after limitation in limitation time T of cluster m) [Wh]; and Y=Σ (average power generation amount $Y_m$ in a predetermined interval of cluster m) [Wh].

Second index=$X_m/Y_m$, where:

$X_m$=the power generation amount of cluster m after limitation in limitation time T [Wh]; and $Y_m$=the average power generation amount of cluster m in a predetermined interval [Wh].

Note: Limitation time T may be taken as integrated limitation time ∫t.

Note: When finding the average power generation amount, various intervals such as a year, a season, or a month may be used as the predetermined interval.

In the above-described exemplary embodiments, each of power generation control devices A, AA, and 2, and control devices B, BB, C, 1, 11, and 12 may be realized by a computer. In this case, a computer reads and executes a program that is recorded on a recording medium that can be read by the computer to execute the functions belonging to any of power generation control devices A, AA, and 2 and control devices B, BB, C, 1, 11, and 12. The recording medium is, for example, a CD-ROM (Compact Disk Read-Only Memory). The recording medium is not limited to a CD-ROM and can be altered as appropriate.

In each of the above-described exemplary embodiments, the configurations shown in the drawings are merely examples, and the present invention is not limited to these configurations.

EXPLANATION OF THE REFERENCE NUMBERS

A, AA power generation control device
A1 communication unit
AA1 determination unit
A2, AA2 control unit
B, BB, C control device
B1, C1 processing unit
B2, C2 communication unit
BB2 control unit
100, 100A, 100B control system
1, 11, 12 control device
1a communication unit
1b, 1b1, 1b2 processing unit
2 power generation control device
2a communication unit
2b control unit
3 PV device
4 power system
4a thermal power plant
4b pumping-up power plant
5 load
6 measurement unit

The invention claimed is:

1. A control device comprising:
a memory storing instructions; and
at least one processor configured to execute the instructions to:
determine output control information of at least a portion of power generation devices among a plurality of power generation devices on a basis of a first index that relates to an output limitation state at a power generation device group and a second index that relates to an output limitation state at a plurality of power generation devices that belong to said power generation device group;
determine said output control information such that a difference between the output limitation state at said power generation device group in an output control time slot and the output limitation state at said power generation devices in said output control time slot decreases; and
determine said output control information to increase a range of change of a maximum-value output of said power generation devices in proportion to increase of a difference between said first index and said second index; and
transmit said output control information to corresponding said power generation devices;
wherein said output limitation state comprises at least one of:
an amount of power generation resulting from output control in the power generation device group or in the power generation device,
an amount of power generation limitation resulting from output control in the power generation device group or in the power generation device,
a maximum-value amount of power generation,
an ON/OFF state of the power generation device,
a time during which output is controlled,
an electricity sales profit that results from output control,
or
electricity sales loss that results from output control.

2. The control device according to claim 1, wherein the at least one processor is further configured to determine said output control information according to the difference between the output limitation state at said power generation device group in an output control time slot and the output limitation state at said power generation device in said output control time slot.

3. The control device according to claim 1, wherein the at least one processor is further configured to determine a portion of said power generation devices that use predetermined output control information from among power generation devices that belong to said power generation device group on the basis of said first index and said second index.

4. The control device according to claim 1, wherein the at least one processor is further configured to determine said output control information in accordance with the difference between a first index that relates to the output limitation state at a power generation device group and a first index that relates to the output limitation state at a power generation device group that differs from said power generation device group.

5. The control device according to claim 1, wherein the at least one processor is further configured to receive the power generation amount of each said power generation device in an elapsed time slot among output control time slots.

6. The control device according to claim 5, wherein the at least one processor is further configured to determine said first index and said second index on the basis of said power generation amount of each said power generation device.

7. A control system comprising:
a plurality of power generation control devices corresponding to each of power generation devices that belong to a power generation device group, and a control device that communicates with said power generation control devices;
wherein:
said control device comprises:

a first memory storing first instructions; and
at least one first processor configured to execute the first instructions to:
determine output control information of said power generation devices on a basis of a first index that relates to an output limitation state at said power generation device group and a second index that relates to an output limitation state at each of said power generation devices;
determine said output control information such that a difference between the output limitation state at said power generation device group in an output control time slot and the output limitation state at each of said power generations devices in said output control time slot decreases; and
determine said output control information to increase a range of change of a maximum-value output of each of said power generation devices in proportion to increase of a difference between said first index and said second index; and
transmit said output control information to corresponding said power generation control devices; and
said power generation control devices each comprise:
a second memory storing second instructions; and
at least one second processor configured to execute the second instructions to:
receive said output control information; and
control output of corresponding said power generation device on the basis of received output control information;
wherein said output limitation state comprises at least one of:
an amount of power generation resulting from output control in the power generation device group or in the power generation device,
an amount of power generation limitation resulting from output control in the power generation device group or in the power generation device,
a maximum-value amount of power generation,
an ON/OFF state of the power generation device,
a time during which output is controlled,
an electricity sales profit that results from output control,
or
electricity sales loss that results from output control.

8. A control method comprising steps of:
determining output control information of at least a portion of power generation devices among a plurality of power generation devices on a basis of a first index that relates to an output limitation state at a power generation device group and a second index that relates to an output limitation state at said plurality of power generation devices that belong to said power generation device group;
determining said output control information such that a difference between the output limitation state at said power generation device group in an output control time slot and the output limitation state at said power generation devices in said output control time slot decreases; and
determine said output control information to increase a range of change of a maximum-value output of said power generation devices in proportion to increase of a difference between said first index and said second index; and
transmitting said output control information to corresponding said power generation devices;

wherein said output limitation state comprises at least one of:
- an amount of power generation resulting from output control in the power generation device group or in the power generation device,
- an amount of power generation limitation resulting from output control in the power generation device group or in the power generation device,
- a maximum-value amount of power generation,
- an ON/OFF state of the power generation device,
- a time during which output is controlled,
- an electricity sales profit that results from output control, or
- electricity sales loss that results from output control.

* * * * *